US011232489B2

(12) United States Patent
Coulter

(10) Patent No.: US 11,232,489 B2
(45) Date of Patent: Jan. 25, 2022

(54) SCENARIO GAMIFICATION TO PROVIDE ACTIONABLE ELEMENTS AND TEMPORALLY APPROPRIATE ADVERTISING

(71) Applicant: David B. Coulter, Tustin, CA (US)

(72) Inventor: David B. Coulter, Tustin, CA (US)

(73) Assignee: Consumer Direct, Inc., Tustin, CA (US)

( * ) Notice: Subject to any disclaimer, the term of this patent is extended or adjusted under 35 U.S.C. 154(b) by 130 days.

(21) Appl. No.: 15/961,809

(22) Filed: Apr. 24, 2018

(65) Prior Publication Data

US 2018/0308317 A1     Oct. 25, 2018

Related U.S. Application Data

(60) Provisional application No. 62/489,351, filed on Apr. 24, 2017.

(51) Int. Cl.
| | | |
|---|---|---|
| *G06Q 30/00* | (2012.01) | |
| *G06Q 30/02* | (2012.01) | |
| *G06Q 40/02* | (2012.01) | |

(52) U.S. Cl.
CPC ......... *G06Q 30/0271* (2013.01); *G06Q 40/02* (2013.01)

(58) Field of Classification Search
None
See application file for complete search history.

(56) References Cited

U.S. PATENT DOCUMENTS

| | | |
|---|---|---|
| 6,279,036 B1 | 8/2001 | Himmel et al. |
| 6,338,050 B1 | 1/2002 | Conklin et al. |
| 6,925,440 B1 | 8/2005 | Shkedi |
| 6,954,741 B1 | 10/2005 | Burchetta et al. |
| 7,003,488 B2 | 2/2006 | Dunne et al. |
| 7,028,052 B2 | 4/2006 | Chapman et al. |
| 7,136,448 B1 | 11/2006 | Venkataperumal et al. |
| 7,139,734 B2 | 11/2006 | Nathans et al. |
| 7,206,768 B1 | 4/2007 | deGroeve et al. |
| 7,249,076 B1 | 7/2007 | Pendleton et al. |

(Continued)

OTHER PUBLICATIONS

U.S. Appl. No. 16/678,952, filed Nov. 8, 2019 Non-Final Office Action dated Oct. 1, 2021.

*Primary Examiner* — Michael W Schmucker
(74) *Attorney, Agent, or Firm* — Rutan & Tucker LLP

(57) ABSTRACT

System and processes for facilitating the gamification of data, including providing scenarios and actionable elements to allow a user to execute at least one preferred or optimal scenario. The system may collate variables autonomously or variables may be entered by a user, the process may include an analysis step whereby, based on the source, trends, and variation of the variables entered, the process presents gamified scenarios and actionable elements. Within a scenario, the user may then manipulate one or more of the outcomes until at least one desired or optimal scenario is achieved. The user may then action various actionable elements to implement the desired or optimal scenario in a real-world situation. The scenarios provided may be aggregated and presented to a user to further enhance the desired or optimal outcome. The system may use the scenarios to provide temporally relevant advertising or notifications pertinent to a user's real-world actions.

31 Claims, 14 Drawing Sheets

(56) References Cited

U.S. PATENT DOCUMENTS

| | | |
|---|---|---|
| 7,249,089 B2 | 7/2007 | Mendizabal et al. |
| 7,280,980 B1 | 10/2007 | Hoadley et al. |
| 7,305,364 B2 | 12/2007 | Nabe et al. |
| 7,318,049 B2 | 1/2008 | Iannacci |
| 7,324,970 B2 | 1/2008 | Magruder et al. |
| 7,349,881 B1 | 3/2008 | Lockwood |
| 7,379,913 B2 | 5/2008 | Steele et al. |
| 7,401,050 B2 | 7/2008 | O'Neill |
| 7,593,891 B2 | 9/2009 | Kornegay et al. |
| 7,610,229 B1 | 10/2009 | Kornegay et al. |
| 7,814,005 B2 | 10/2010 | Imrey et al. |
| 7,818,228 B1 | 10/2010 | Coulter |
| 7,853,493 B2 | 12/2010 | DeBie et al. |
| 7,877,304 B1 | 1/2011 | Coulter |
| 7,970,679 B2 | 6/2011 | Kasower |
| 8,060,424 B2 | 11/2011 | Kasower |
| 8,078,524 B2 | 12/2011 | Crawford et al. |
| 8,195,549 B2 | 6/2012 | Kasower |
| 8,285,613 B1 | 10/2012 | Coulter |
| 8,417,627 B2 | 4/2013 | Cerise et al. |
| 8,515,844 B2 | 8/2013 | Kasower |
| 8,732,073 B2 | 5/2014 | Thomas |
| 8,930,263 B1 | 1/2015 | Mahacek et al. |
| 9,443,268 B1 | 9/2016 | Kapczynski et al. |
| 9,569,797 B1 | 2/2017 | Rohn et al. |
| 2001/0053967 A1 | 12/2001 | Gordon et al. |
| 2002/0072975 A1 | 6/2002 | Steele et al. |
| 2002/0077964 A1 | 6/2002 | Brody et al. |
| 2002/0087460 A1 | 7/2002 | Hornung |
| 2002/0091625 A1 | 7/2002 | Blauvelt et al. |
| 2002/0099649 A1 | 7/2002 | Lee et al. |
| 2002/0173994 A1 | 11/2002 | Ferguson |
| 2002/0194096 A1 | 12/2002 | Falcone et al. |
| 2002/0194122 A1 | 12/2002 | Knox et al. |
| 2003/0014265 A1 | 1/2003 | Landry et al. |
| 2003/0028406 A1 | 2/2003 | Herz et al. |
| 2003/0036995 A1 | 2/2003 | Lazerson |
| 2003/0036996 A1 | 2/2003 | Lazerson |
| 2003/0046223 A1* | 3/2003 | Crawford .............. G06Q 40/00 705/38 |
| 2003/0065805 A1 | 4/2003 | Barnes |
| 2003/0093289 A1 | 5/2003 | Thornley et al. |
| 2003/0135451 A1 | 7/2003 | O'Brien et al. |
| 2003/0149659 A1 | 8/2003 | Danaher et al. |
| 2003/0154406 A1 | 8/2003 | Honarvar et al. |
| 2003/0229580 A1 | 12/2003 | Gass et al. |
| 2004/0024703 A1 | 2/2004 | Roskind |
| 2004/0039690 A1 | 2/2004 | Brown et al. |
| 2004/0054619 A1 | 3/2004 | Watson et al. |
| 2004/0111359 A1 | 6/2004 | Hudock |
| 2004/0111370 A1 | 6/2004 | Saylors et al. |
| 2004/0153663 A1 | 8/2004 | Clark et al. |
| 2004/0158521 A1 | 8/2004 | Newton et al. |
| 2004/0177030 A1 | 9/2004 | Shoham |
| 2004/0199456 A1 | 10/2004 | Flint et al. |
| 2004/0243508 A1 | 12/2004 | Samson et al. |
| 2005/0015304 A1 | 1/2005 | Evroni et al. |
| 2005/0021462 A1 | 1/2005 | Teague et al. |
| 2005/0080718 A1 | 4/2005 | Desai |
| 2005/0125686 A1 | 6/2005 | Brandt |
| 2005/0154664 A1 | 7/2005 | Guy et al. |
| 2005/0182713 A1 | 8/2005 | Marchesi |
| 2006/0031158 A1 | 2/2006 | Orman |
| 2006/0059073 A1 | 3/2006 | Walzak |
| 2006/0080230 A1 | 4/2006 | Freiberg |
| 2006/0089905 A1 | 4/2006 | Song et al. |
| 2006/0190394 A1 | 8/2006 | Fraser et al. |
| 2006/0200396 A1 | 9/2006 | Satterfield et al. |
| 2006/0218067 A1 | 9/2006 | Steele |
| 2007/0067297 A1 | 3/2007 | Kublickis |
| 2007/0078786 A1 | 4/2007 | Bous et al. |
| 2007/0088851 A1* | 4/2007 | Levkovitz .............. G06Q 30/02 709/246 |
| 2007/0112668 A1* | 5/2007 | Celano ................ G06Q 40/025 705/38 |
| 2007/0150411 A1 | 6/2007 | Addepalli et al. |
| 2008/0021802 A1 | 1/2008 | Pendleton |
| 2009/0216639 A1 | 8/2009 | Kapczynski et al. |
| 2010/0169209 A1* | 7/2010 | Kornegay ............ G06Q 40/025 705/38 |
| 2011/0166988 A1 | 7/2011 | Coulter |
| 2012/0022990 A1 | 1/2012 | Kasower |
| 2012/0197781 A1 | 8/2012 | Valetutti et al. |
| 2012/0265681 A1 | 10/2012 | Ross |
| 2012/0271709 A1* | 10/2012 | Ogawa ................ G06Q 30/0242 705/14.42 |
| 2013/0103571 A1 | 4/2013 | Chung et al. |
| 2013/0262291 A1 | 10/2013 | Ricci |
| 2013/0332341 A1 | 12/2013 | Papadimitriou |
| 2014/0089167 A1 | 3/2014 | Kasower |
| 2014/0156501 A1 | 6/2014 | Howe |
| 2017/0228820 A1* | 8/2017 | Rohn .................. G06Q 40/025 |
| 2018/0308317 A1* | 10/2018 | Coulter ................ G06Q 40/02 |

\* cited by examiner

SCENARIO GAMIFICATION TO PROVIDE ACTIONABLE ELEMENTS AND TEMPORALLY APPROPRIATE ADVERTISING

CROSS-REFERENCE TO RELATED APPLICATIONS

This application claims the benefit of priority to U.S. Provisional Application No. 62/489,351, filed Apr. 24, 2017, and titled "Scenario Gamification to Provide Actionable Elements and Temporally Appropriate Advertising" which is incorporated by reference in its entirety into this application.

FIELD OF THE INVENTION

Embodiments of the present invention generally relate to the field of systems and processes for facilitating the gamification of data, for example, providing various scenarios and actionable elements to allow a user to implement at least one preferred or optimal outcome of a scenario in a real-world setting.

BACKGROUND

In an increasingly data driven world, individuals and businesses rely on data to make informed decisions about real-world events. However, large volumes of information can often lead to a paralysis of choice where the optimum outcome is obscured. In some situations, the results from a set of actions prove less than successful, leaving an individual wondering if the actions taken were ineffective or there were some other variables affecting the outcome that were unaccounted for. Further, the synergistic effects of certain variables or actions may either boost the end result, or equally may have detrimental effects.

Often similar scenarios facing an individual have been previously encountered by others. Accordingly, valuable advice and collective experience that would greatly help in cutting away unnecessary data and identifying optimum outcomes is left untapped. Often the user is unaware of the scenarios previously experienced. Alternatively, due to privacy issues, the user is unable to access this wealth of collective experience in order to learn and implement a better decision process in a real-world setting.

This overwhelming amount of information is particularly prevalent in marketing and advertising. In an increasingly crowded consumer marketplace, the volume of choice for products and services, together with the channels by which these are advertised, frequently leads to consumer fatigue. This leads third parties to fight for attention and aggressively push their products and services, thus exacerbating the problem. Often, various third parties attempt to monitor an individual's actions in order to anticipate which goods and services would be most relevant to a user and therefore direct appropriate advertising to the user. However, this provides inherently obsolete information since they show what has just occurred, rather than what a user is expected to do. For example, if an individual has searched for and bought an item online, any advertisements to similar items are now obsolete, leaving the third party guessing as to what the user is looking for next. This wastes the individual's attention resources, compounds consumer fatigue and leads to an inefficient use of advertising resources.

Accordingly, there remains a need for a system and a process that is able to present the 'gamification' of variables pertinent to a given scenario in an easily understood form, whereby a user may adjust, modify, manipulate, or 'play around' with certain outcomes in a scenario. Once the user has achieved the optimum scenario or desired outcome, the system then facilitates the implementation of the scenario or outcome in a real-world setting. The system may use data from similar scenarios, information from other users, previous scenarios created by the user, data pertinent to the user, or the like, in order to monitor trends, better advise the user, and improve predicted outcomes while maintaining users privacy. The system may also consider if there are any penalties associated with an activity or trend to improve predicted outcomes. Accordingly, the improved success of the outcome will entice further and continued use of the gamification system. Based on the user's implemented actions, the system may be able to determine which goods or services are most pertinent to the user and when the user will benefit most from these goods or services. Accordingly, the system may be able to provide temporally relevant advertising or marketing communications to the user. This can reduce consumer fatigue and increase the effectiveness of the advertisements presented.

SUMMARY

The present systems and processes are directed to providing various optimum scenarios or desired outcomes to a user based on specific variable channels. The system provides a gamified interface to facilitate the decision process for a user. The gamified interface may include providing the most extreme outcomes possible, as well as at least one estimated outcomes recommended outcome, range of outcomes, or combinations thereof. Once an optimum or preferred scenario or outcome is achieved, the system also provides various actionable elements to the user in order to implement the scenario in a real-world situation. The system may use these scenarios to predict advantageous scenarios for the same or other users, providing anonymized variables that would otherwise be unavailable to the user. The system may also use the implemented scenarios to provide temporally appropriate advertising or similar marketing communication. The system may also provide temporally appropriate alerts or notifications.

In some embodiments, the system may include variables entered directly by the user or may be provided by a third party. Data provided by a third party may be further modified by the user. The types of variables entered to the system may include personal, demographic, geographic, economic, historical, social, behavioral, and/or psychographic information. The system may then present one or more scenarios or outcomes to the user based on the variables provided and predetermined parameters or rules. The system may modify these predetermined parameters or rules based on trends identified from the variables. The system may also provide information from other users of the system from previous scenarios or outcomes to identify trends and predict optimal outcomes specific for the user. The system may also present the information in a form whereby the significance of the different variables on the outcome are indicated. This automatic provision of accurate scenarios will entice further and continued use of the system.

In some embodiments, the system may also present a gamification of variables by presenting the variables to the user so that a user may then modify, manipulate or 'play around' with the scenario within a gamified interface. By using the gamified interface provided by the system, a user may modify the desired outcome or modify one or more of the variables in the scenario. The system may react to and reanalyze the changes, effected by the user, in the gamified graphical interface to provide alternate scenarios or outcomes. Once the user has achieved an optimum scenario or preferred outcome the system may then provide a means, such as actionable elements to implement these changes in a real-world setting. The actionable elements may for example allow a user to save, print, e-mail the scenario and associated parameters, or import or transfer the information to another tool within the system. The actionable element may also allow a user to directly implement the optimum or preferred scenario to a real-world setting. The actionable elements may provide access to third parties with which the optimum or preferred scenario may be implemented. In some embodiments, the actionable elements may provide instructions to the third parties, and these instructions may be triggered based on time dependent or action dependent triggers to effectively implement the optimum or preferred scenario in a real-world setting. The system may also further leverage the actioned scenarios to predict time appropriate advertising or notifications for the user.

In some embodiments, a method for presenting gamified scenarios and temporally appropriate advertising is provided which includes obtaining one or more variables for initiating a scenario; analyzing the one or more variables according to one or more predetermined rule sets to provide a first outcome to a scenario in a gamified user interface; receiving a first input, via the gamified user interface, that modifies the first outcome to provide a preferred outcome; analyzing the preferred outcome according to one or more predetermined rule sets; providing a second scenario which displays proposed changes to the variables that are required to achieve the preferred outcome; in response to receiving a second input via an actionable element, providing instructions for modifying the one or more variables according to the proposed changes in order to implement the preferred outcome in a real-world setting; and providing on or more advertisements based on the instructions for modifying the one or more variables.

In some embodiments, the method further includes at least one of primary, secondary or tertiary variables. The primary variables include variables entered by a user and include at least one of personal, demographic, geographic, economic, historical, social, behavioral, psychographic information. The secondary variables include information stored, derived or generated by the system and include at least one of information from other users, previous scenarios generated by other users, information generated by the implementation engine, information generated by the predictive scenario engine, or information generated by the advertising engine. The tertiary variables include information provided by one or more third parties and include at least one of personal, demographic, geographic, economic, historical, social, behavioral, psychographic information.

In some embodiments, the method further includes receiving input via an actionable element and providing instructions for modifying the one or more variables, which are provided to a user or to a third party to implement the preferred outcome in a real world setting. In some embodiments, the method further includes obtaining one or more variables for initiating a scenario which is determined according to trends identified in at least one of the primary, secondary, or tertiary variables. In some embodiments, the method further includes providing notifications or alerts to the user which are temporally appropriate to one or more instructions such that the notifications or alerts are provided within a predetermined time frame. In some embodiments, the method further includes advertisements which are temporally appropriate to one or more instructions such that the advertisements are provided within a predetermined time frame.

In some embodiments, a non-transitory computer readable medium is provided which, when processed by a hardware processor, provides a scenario via a gamified user interface, and provides advertisements and notifications to a user which are temporally relevant to implemented actions from the scenario. The non-transitory computer readable medium including an implementation engine to retrieve variables, the implementation engine configured to analyze the variables according to a set of predetermined rules and weightings, and to generate a scenario including a primary marker associated with an outcome, wherein the scenario includes a gamified user interface, and wherein the outcome includes a current outcome based on the variables initially retrieved by the implementation engine. The non-transitory computer readable medium including a predictive scenario engine configured to analyze the variables to determine a range of possible preferred outcomes within the scenario. The non-transitory computer readable medium including an advertising engine configured to provide advertisements to the user.

In some embodiments, the non-transitory computer readable medium includes a gamified user interface which includes a primary marker that allows a user to modify the outcome of the scenario to a preferred outcome, and includes secondary markers that indicate the range of possible preferred outcomes. In some embodiments, the implementation engine generates a second scenario and provides instructions for changing the variables that will achieve the preferred outcome as determined by the user, subsequent to the user modifying the outcome to a preferred outcome. In some embodiments, the non-transitory computer readable medium includes secondary markers that indicate a range of preferred outcomes and are determined by trends identified by the predictive scenario engine.

In some embodiments, the non-transitory computer readable medium includes actionable elements where the gamified user interface provides instructions for modifying the variables to achieve the preferred outcome as determined by the user. In some embodiments, the non-transitory computer readable medium includes an advertising engine that provides advertisements which are temporally appropriate to instructions such that the advertisements are provided within a predetermined time frame. In some embodiments, the non-transitory computer readable medium includes a gamified user interface which provides alerts that are temporally appropriate to the instructions such that the alerts are provided within a predetermined time frame.

In some embodiments, the non-transitory computer readable medium includes variables including at least one of personal, demographic, geographic, economic, historical, social, behavioral, trend, or psychographic information. In some embodiments, the non-transitory computer readable medium includes a gamified user interface which allows a user to repeatedly modify the outcome until a preferred outcome is reached. In some embodiments, the non-transitory computer readable medium includes a scenario and actionable elements which provides access with one or more third parties. In some embodiments, the non-transitory computer readable medium includes a gamified user interface and provides icons that are associated with a primary marker which indicates goods or services that will be available when the preferred outcome is achieved.

In some embodiments, a network device is provided including a hardware processor, and memory communicatively coupled to the hardware processor. The device including (i) an implementation engine to retrieve variables, the implementation engine configured to analyze the variables according to a set of predetermined rules and weightings, and to generate a scenario including a primary marker associated with an outcome, wherein the scenario includes a gamified user interface, and wherein the outcome includes a current outcome based on the variables initially retrieved by the implementation engine. (ii) A predictive scenario engine configured to analyze the variables to determine a range of possible preferred outcomes within the scenario. (iii) An advertising engine to provide advertisements and notifications to a user which are temporally appropriate to instructions generated by the scenario via actionable elements such that the advertisements and notifications are provided within a predetermined time frame.

In some embodiments, a network device is provided including variables which include at least one of personal, demographic, geographic, economic, historical, social, behavioral, trend, or psychographic information. In some embodiments, a network device is provided including actionable elements that provide access to one or more third parties to implement the preferred scenario. In some embodiments, a network device is provided including a scenario which further provides one or more icons associated with the outcome that indicates to a user the good or services associated with the outcome and allows a user to access details about the goods or services, or access to third parties that provide the goods or services. In some embodiments, a network device is provided including a scenario which further provides one or more icons associated with the range of possible preferred outcomes of the implementable scenario that indicates to a user the good or services associated with range of possible preferred outcomes and allows a user to access details about the goods or services, or access to third parties that provide the goods or services.

BRIEF DESCRIPTION OF THE DRAWINGS

To further clarify embodiments of the disclosure, a more particular description will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

Figure 1:
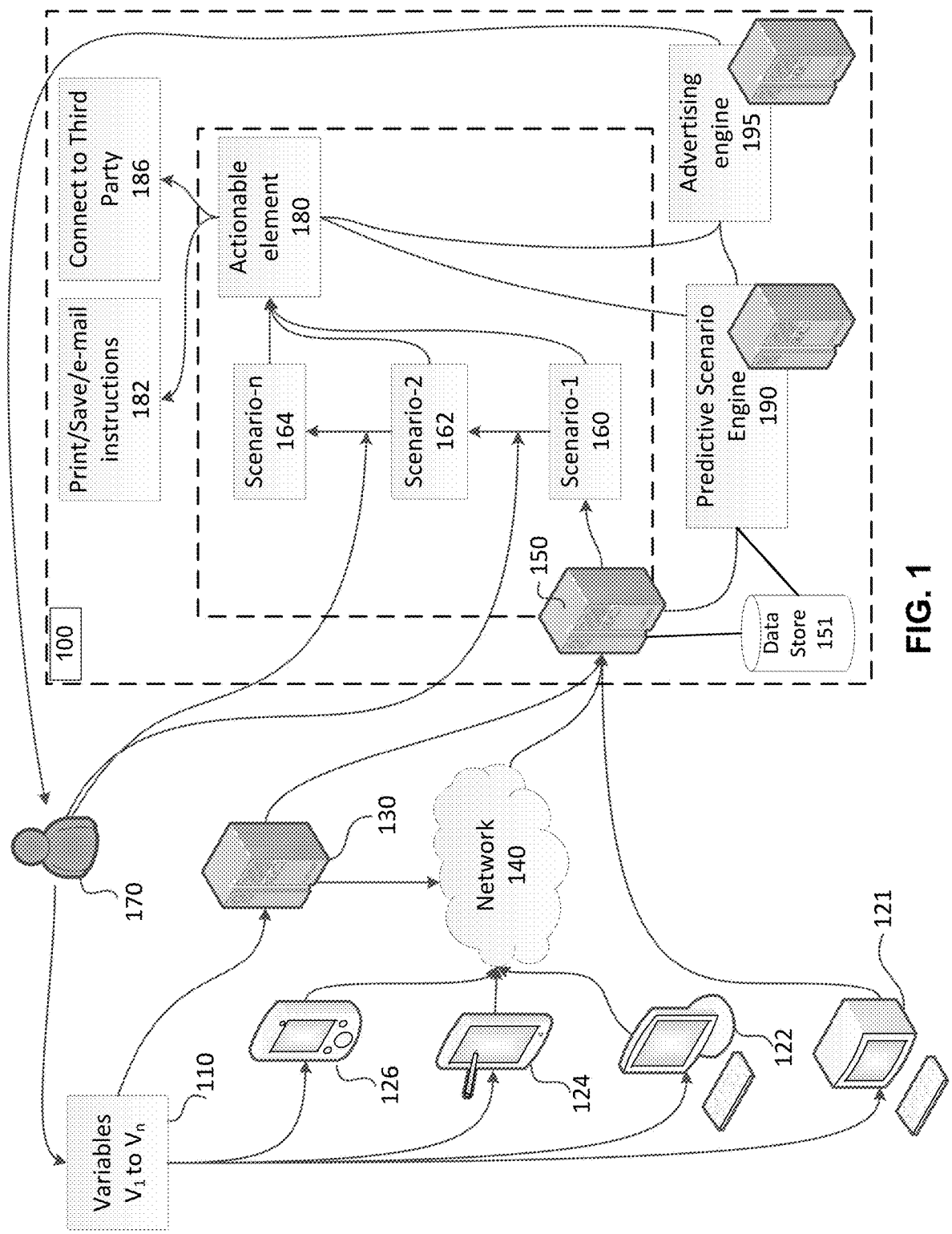
FIG. 1 illustrates an exemplary structure of the system, in accordance with the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "a first actionable element," may be made. However, the specific numeric reference should not be interpreted as a literal sequential order but rather interpreted that the "first actionable element" is different than a "second actionable element." Thus, the specific details set forth are merely exemplary. The specific details may be varied from and still be contemplated to be within the spirit and scope of the present disclosure. The term "coupled" is defined as meaning connected either directly to the component or indirectly to the component through another component. As used herein, "communication" generally refers to related data that is received, transmitted, or exchanged within a communication session. The data may include a plurality of packets, where a "packet" broadly refers to a series of bits or bytes having a prescribed format. Alternatively, the data may include a collection of data that may take the form of an individual or a number of packets carrying related payloads, e.g., a single webpage received over a network. Further, as used herein, the terms "about," "approximately," or "substantially" for any numerical values or ranges indicate a suitable dimensional tolerance that allows the part or collection of components to function for its intended purpose as described herein. In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

In an exemplary embodiment, a system and a process is provided to provide the gamification of various scenarios and outcomes to a user based on primary, secondary, tertiary variables, or combinations thereof. A user may use a gamified interface to set desired outcomes and the system will provide actionable elements and pertinent variables to facilitate the implementation of the desired scenario or outcome in a real-world setting.

In an exemplary embodiment, variables may be entered into the system either directly from the user, termed primary variables, or from one or more third parties, termed tertiary variables. The system may also provide further variables, termed secondary variables. These variables may be based on previous scenarios from other users, previous scenarios implemented by the same user, data trends identified by the system, or other information derived by the system or from the user or other users of the system. The types of variables entered to the system may include, for example, personal, demographic, geographic, economic, historical, social, behavioral, psychographic information, or the like.

In an exemplary embodiment, the system may use these variables to present one or more scenarios to the user. The system may also use secondary variables to further refine the scenario presented to the user. The system may also use primary, secondary, and/or tertiary variables to provide suggestions, ranges or advice to the user derived for example from other users or similar scenarios. The system and process may present a gamification of the scenarios and a graphical user interface.

In an exemplary embodiment, the gamified user interface allows a user to implement changes, modify, adjust, or manipulate the outcomes of the scenario within the interface. In response, the system provides the variables and/or actions necessary to achieve the outcomes selected by the user. The system may use secondary variables to better predict the necessary information or variables required to achieve the outcome. It is also contemplated that primary and tertiary variables may be used in this way. The system may also allow a user to further modify the input variables. In response the system may provide additional scenarios. In this way the gamification of data may allow a user to play around and achieve an optimal scenario or outcome.

In an exemplary embodiment, once an optimum or preferred scenario is achieved, the system and process may also provide the user with actionable elements for implementing the scenario in a real-world situation. Such actionable elements may for example, allow a user to save, print, send, or e-mail the scenario, parameters, instructions, or defining features associated with the optimum or preferred scenario. The actionable elements may also connect the user directly with one or more third parties in order to allow the user to implement the scenario in a real-world situation.

In an exemplary embodiment, the system may provide temporally relevant advertising to the user. The system may use previous scenarios, primary, secondary, tertiary variables, or combinations thereof to assess which goods and services may be relevant to the user and at what time the goods or services may be most relevant to the user. In an exemplary embodiment, the system may use the implemented scenario to assess which goods and services may be relevant to the user and at what time the goods or services may be most relevant to the user. In this way consumer fatigue is reduce and the effectiveness of the advertisements is increased.

In an exemplary embodiment, the system may provide one or more icons associated with one or more preferred outcomes. These icons may provide advertisements or links to connect a user to goods or services. In this way, a user may be able to see which goods or services may be available once a preferred outcome is achieved.

In an embodiment, the system may provide temporally relevant alerts or notifications. These may be provided when one or more of the preferred outcomes is about to be achieved or has been achieved. The alerts or notifications may provide encouragement or rewards to the user in the form of medals, trophies. The rewards may be provided to the user within the system and may be displayed as part of the user's profile, and may motivate the user to continue to use the system. In an embodiment, the alerts and notifications alert the user to changes that occur in a real-world setting that may affect one or more of the implemented scenarios. These and other embodiments will be discussed in greater detail herein.

FIG. 1 illustrates an exemplary system 100 in accordance with the present disclosure. The system 100 may include one or more variables $V_1$ to $V_n$, 110. The one or more variables 110 may be entered into the system as primary, secondary, tertiary information, or combinations thereof. Primary information may be defined as information entered directly into the system 100 by a user 170. Secondary information may be defined as information stored, derived or generated by the system, this may include information from or about other users of the system 100, data generated by the system from the user or other users of the system 100, scenarios generated by other users of the system, information generated by the predictive scenario engine 190, advertising engine 195, or the like. Tertiary information may be defined as information provided to the system 100 by way of one or more third parties 130.

A user 170 may enter variables into the system 100 either by way of a machine or terminal 121 connected to the system and specifically configured for the entry of the variables 110, or by way of a general purpose computing device selectively activated or reconfigured by a computer program stored in the computer. Non-limiting examples of a general purpose computing device include, personal computer 122, tablet 124, smart phone 126, or similar device. The devices 121, 122, 124, 126 may be connected directly with a server 150 or connected to the server 150 by way of a centralized or decentralized network 140, as will be described herein. It will be appreciated that the network 140 may include a Local Area Network (LAN), Wireless Local Area Network (WLAN), Virtual Private Network (VPN), intranet, internet, a 'cloud' based network, or similar centralized or decentralized, wired or wireless network that fall within the scope of the present invention.

Secondary variables may be stored, collated, aggregated, and analyzed by a predictive scenario engine 190. The predictive scenario engine 190 may use rules based techniques, machine learning techniques, artificial intelligence (A.I.), neural networks, or combinations thereof to provide the system 100 with refined scenarios, determine key variables that are pertinent to a scenario, identify trends in users behavior, improve the accuracy of the scenarios in a real-world setting, or the like, as will be described in more detail herein. The predictive scenario engine 190 may also work in conjunction with an advertising engine 195 to analyze, advise, or predict when a user would be most interested in certain goods or services, thereby providing temporally relevant advertising to the user, as will be described in more detail herein. Similarly, the system may also provide temporally appropriate alerts or notifications.

The system 100 may obtain variables 110 by way of one or more third parties 130. It is contemplated that a third party may request, collect, or derive information pertaining to the user. In an exemplary embodiment, the user 170 may provide the variables 110 directly to a third party 130. The system 100 may then request access to these variables 110 held by the one or more third parties 130. The user may also allow the system access to these variables 110 held by the one or more third parties 130. It is also contemplated that variables 110 held by a third party 130 may be provided to one or more subsequent third parties (not shown) before being obtained by the system 100.

The variables 110 may include various types of variables including, but not limited to, personal, demographic, geographic, economic, historical, social, behavioral, psychographic information or data. Personal data may include, but not limited to, name, address, date of birth, phone numbers, e-mail addresses, occupation, social security number, or the like. Demographic data may include, but not limited to, gender, age, ethnicity, religion, education, or the like. Geographic data may include, but not limited to, home location, work location, immediate location, place of birth, or the like. Economic data may include, but not limited to, income, expenses, banking information, number of dependents, home ownership, rolling debt, loans, credit reports, credit scores, public records, liens, bankruptcy information, investments, or the like. Historical data may include, but not limited to, trends or changes in personal, demographic, geographic, economic, historical, social, behavioral, psychographic data over time. Social data may include, but not limited to, social media, criminal records, public records, place of marriage, or the like. Behavioral data may include, but not limited to, patterns of expected changes in personal, demographic, geographic, economic, historical, ethnic, social data over time. Psychographic data may include, but not limited to, psychological factors, lifestyle factors, travel destinations, hobbies, interests, values, opinions, or the like.

The system 100 may then use predetermined rules, machine learning techniques, A.I., neural networks, or combinations thereof to store, parse, and analyze the variables 110, or combinations thereof, using non-transitory media housed by a server 150. An implementation engine on server 150 may be specifically designed or configured to use a set of predetermined rules with predetermined weightings, machine learning techniques, A.I., neural networks, or combinations thereof to collate, parse, analyze, and/or present the variables 110. The predetermined rules, predetermined weightings, machine learning techniques, A.I., neural networks, or combinations thereof may be stored on a data store 151 communicatively connected to the system 100. The system 100 will query the primary, secondary, and/or tertiary variables and select variables according to predetermined rules which include predetermined weightings towards certain variables. The system 100 may then present the variables by way of a specifically configured gamified user interface. As used herein, presenting may include querying, selecting, parsing, analyzing, and displaying the variables. The user interface may collate and present variables pertinent to the user. The user interface may be preconfigured by the system, be configurable by the user, or combinations thereof.

The user interface may present the gamification of the variables 110, in the form of a first scenario, such as scenario-1 160. A first scenario 160 may include the presentation of a selection of the variables 110. It is contemplated that one or more of the variables 110 may be combined, transposed, analyzed or calculated to create one or more further variables which may then be included in the scenario. Based on the variables entered, the system will present a first scenario 160 with an initial outcome or set of outcomes that the system determines to be most favorable to the user. It is contemplated that the first scenario may also present the current real-world situation as either a reference point or as a proposed outcome. As used herein, it will be appreciated that any 'outcome' may also include a set of one or more outcomes. The user 170 may then modify the outcome of the first scenario 160. Such changes may include setting a preferred outcome to the scenario. In some embodiments, the user may modify the variables used in the scenario.

In an exemplary embodiment, once a user has modified the first scenario 160, the system will analyze the modifications to the outcome and determine, using predetermined rules, weightings, machine learning techniques, A.I., or the like, the changes to the variables 110 that are required to achieve the modified outcome in a real-world setting. The system 100 will then display the modifications, and requisite changes to the variables, in a new scenario. Accordingly, as used herein, the system will 'present' a second scenario to the user, scenario-2 162, based on the modifications to the first scenario 160. The user may then further modify the second scenario 162. Each time the scenario is modified the system may present a new scenario based on these modifications. In exemplary embodiments, the system may dynamically update the scenarios with the changes and automatically present new scenarios, or the system may require a user to submit the changes in order to request subsequent scenarios, these and other methods of submitting the changes to the scenario are contemplated to fall within the scope of the present invention.

In exemplary embodiments, a number of scenarios, scenario-1 160 to scenario-n 164, may be generated. The user may continue to adjust, modify or manipulate the outcomes, the variables, or combinations thereof until the user achieves an optimum or preferred scenario outcome, scenario-n 164. In this way, the system may gamify the variables received so that they are presented and displayed in a meaningful way to the user. Further, any changes implemented in the scenario may create changes in associated variables or outcomes. In this way a user may also see the consequence of these changes to the scenario.

In an exemplary embodiment, the variables 110 in the scenarios, 160, 162, 164, may be presented to a user and adjusted by way of graphical interfaces. Such graphical interfaces may include, but not limited to, sliders, wheels, temperature gauges, contour charts, area maps, radar charts, bubble charts, graphical representations of real-world situations, avatars, or the like. These interfaces facilitate the gamification of the variables so that a user may observe changes. The system may also use the graphical interfaces to highlight the impact of the different variables. For example, secondary variables provided by the predictive scenario engine 190 may anticipate that a change in a first variable may have a greater impact on the outcome than an equal or greater change in a second variable. The gamified user interface may highlight this to the user. Similarly, in a further example, the predictive scenario engine 190 may determine the synergistic effect of two or more given variables may have a greater impact on the outcome than other combinations of variables. Accordingly, the gamified user interface may highlight this impact to the user.

In an exemplary embodiment, the system may also provide actionable elements 180. The actionable elements may be in accordance with the features set forth in U.S. Pat. Nos. 7,818,228; 7,877,304; and 8,285,613; and U.S. Patent Publication No. 2011/0166988, each titled, "System And Method For Managing Consumer Information", and each of which are incorporated by reference in its entirety into this application. The actionable elements may be, by way of a non-limiting example, action buttons. Once the user has achieved the optimum or preferred scenario, scenario-n 164, a user may use the actionable elements 180 to implement the scenario-n 164 in a real-world setting. As used herein, such implementation may include, but not limited to, providing, saving, printing, or e-mailing the variables, outcomes, changes, parameters, instructions, or other defining features, or combinations thereof, for the scenario 182. The actionable elements 180 may also be linked directly with one or more third parties 186. The one or more third parties 186 may be different from the one or more third parties identified by 130 or they may be the same third parties as those identified by 130, or a combination thereof. The actionable elements 180 may provide the user access to third parties, or the actionable elements 180 may provide instructions from the user to the third parties. It is also contemplated that actionable elements 180 may send some or all of the instructions at a time best suited to the implementation. For example, once the actionable element is actioned, the system may send some instructions immediately, the system may send some instructions on one or more specific dates, the system may send some instructions depending on the occurrence of other actions or events, or combinations thereof. It is also contemplated that the actionable elements may connect a user with other tools. These tools may be part of the system or may be located outside of the system. In this way, changes reflected by the scenario-n 164 may be directly implemented in a real-world setting.

Variables, outcomes, information, changes, parameters and other defining features pertaining to the scenario-n 164 may also be stored by the system. These secondary variables from multiple scenarios and from multiple users may be aggregated, stored, parsed and analyzed, using predetermined rules, machine learning techniques, A.I., or the like, by a predictive scenario engine 190. These secondary variables may be provided to the system and used to refine future scenarios, identify trends in the users behavior or trends in behavior for various groups of users, determine key variables that are pertinent to a scenario, improve the accuracy of the scenarios in a real-world setting, or the like. By way of a non-limiting example the system may aggregate the preferred scenarios, scenario-n 164, from a number of users. The system may then parse and analyze the data based on a number of predetermined conditions or rules. The system may modify these predetermined parameters or rules based on trends identified from the primary, secondary or tertiary variables. A user 170 establishing a new scenario may enter new variables. Based on the user's 170 variables 110 and on the secondary variables provided by the predictive scenario engine 190, the system may predict certain outcomes more accurately or suggest certain changes to the user's scenarios in order to expediently achieve the optimum or preferred scenario, scenario-n 164.

In an exemplary embodiment, the predictive scenario engine 190 works in conjunction with an advertising engine 195. The advertising engine 195 may use predetermined rules, machine learning techniques, A.I., or the like, to analyze previous scenarios from the user or other users of the system, identified trends, primary, secondary, tertiary variables from the user or other users of the system, or combinations thereof, to determine temporally relevant advertisements to the user 170, such that the advertisements are provided within a predetermined time frame. The advertisements may, for example, be provided from outside the system from one or more third parties, from within the system, or combinations thereof. Advertisements from within the system may be stored, or generated by, the advertising engine and may be directed to features relating to the system itself. The third parties providing the advertisements may be the same as the third parties 130, third parties 186, different third parties, or combinations thereof. The advertising engine 195 may analyze and determine which goods and services would be most relevant to the user and also when the goods and services may be most pertinent to the user, such that the advertisements for the goods and services are provided within a predetermined time frame determined to be most relevant to the user.

As previously noted, current methods for providing advertisements to a user include monitoring an individual's actions and providing advertisements based on these actions. However, the current methods are not optimal as discussed. By contrast, in an exemplary embodiment, the system and process described herein determines actions that a user may make in the future based on the one or more scenarios created and/or actioned by the user. It is also contemplated that the system may also accurately determine the future actions of the user by way of scenarios created prior to implementing, or based on primary, secondary, tertiary variables, or combinations thereof. The system may determine which goods or services may be most pertinent to the user and provide advertisements relating to these goods and services to the user.

In an exemplary embodiment, the advertising engine 195 determines when the goods and services would be most pertinent to the user. In an exemplary embodiment, the system provides advertisements directed to features found within the system. In an exemplary embodiment, the system provides notifications to the user, based on primary variables, secondary variables, tertiary variables, other scenarios, or combinations thereof. By way of a non-limiting example, the alerts or notifications may provide the user with additional tools or advice based on actions that may affect the outcome of previously implemented scenarios. The alerts or notifications may also offer rewards or encouragement to motivate the user into continued use of the system, to achieve a previously implemented preferred outcome of a scenario, or the like. In this way, the system may reduce consumer fatigue and increase the effectiveness for the advertisements provided by the one or more third parties.

In an exemplary embodiment, third parties may work in conjunction with the system to provide advertisements relating to their products and services to the users of the system. The system may advise the third parties of which goods and services would be most pertinent to which users and when so that the third parties may provide advertisements, either directly or indirectly, to the users. In an exemplary embodiment, the third parties may provide advertisements and associated information to the advertising engine 195 and the system may then determine which of these advertisements may be most pertinent to the users and provide these advertisements at the most appropriate time.

In an exemplary embodiment, third parties may use the system and processes to facilitate providing temporally appropriate advertisements to customers, or potential customers, of the third parties. It is contemplated that the customers, or potential customers, may not necessarily be users of the system. Third parties may provide variables to the system, these variables may, for example, include variables that relate to customers of the one or more third parties, information relating to potential customers, or the like. Third parties may also provide advertisements and associated information to the system. The system may then use the variables provided by the third party, along with primary, secondary, tertiary variables, predetermined rules, associated trends, or the like, to determined which advertisements would be most pertinent to the customers of the third parties, potential customers, users of the system, or the like. In this way, third parties may work with the system to provide temporally appropriate advertisements or notifications to their customers, or potential customers of the third parties. Accordingly, third parties may work with the system to reduce consumer fatigue and increase the effectiveness for their advertisements.

It will be appreciated that the implementation engine 150, predictive scenario engine 190, and advertising engine 195 may be located on different machines that are in different geographical locations, on the same machine, in the same geographical location, or combinations thereof without departing from the spirit of the invention.

Figure 2:
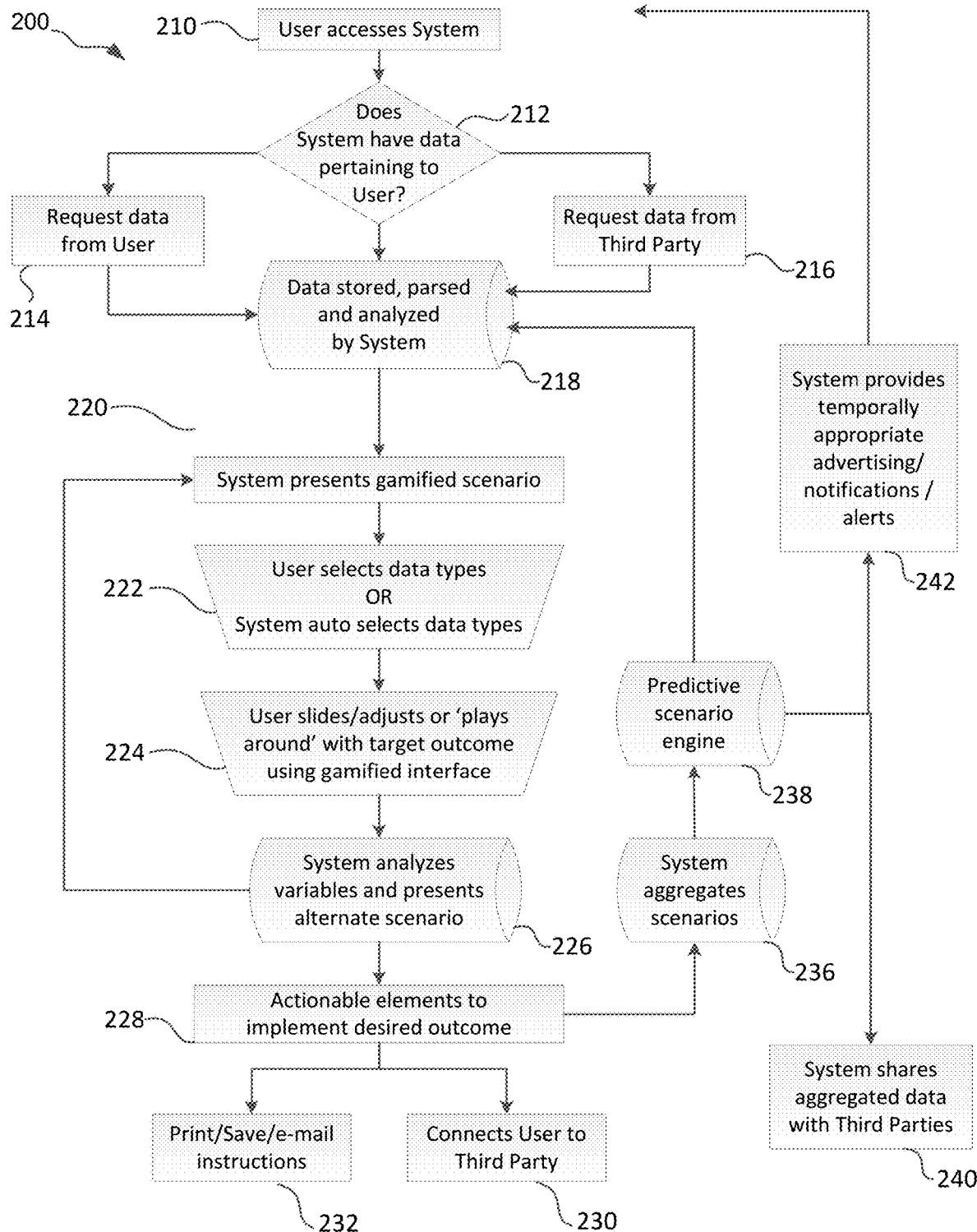
FIG. 2 illustrates an exemplary flowchart of the process, in accordance with the present disclosure.

FIG. 2 illustrates an exemplary process 200 in accordance with the present disclosure. Initially, a user 170 accesses the system 210. This may involve establishing a user account, profile, connection, or similar porthole. The account may be protected by password, PIN, fingerprint recognition, facial recognition or similar such protection that falls within the scope of the present invention. Once a user 170 has established access, the system may decide whether or not there are variables already pertaining to the user stored on the system 212. The system may also request further primary variables from the user 214. The system may also request tertiary variables 216 from third parties 130. The system may also request access or permission from the user 170 to request tertiary variables from third parties 130. The system may further include secondary variables provided by, for example, the predictive scenario engine 190. The system may then collate, store, parse and analyze the variables 218.

The system may then use a gamified user interface to present an initial scenario, scenario-1 220. It is contemplated that there may be various additional steps prior to presenting scenario-1 220 to the user, these may include one or more interfaces or home pages that present different types of scenarios available to the user. It is also contemplated that the system may present various choice steps, decision trees, or 'setup wizards' that aide the user in choosing the type of scenario desired and/or the variables to be used. In an exemplary embodiment, the system may auto select the type of scenario desired and/or the variables to be used according to a set of predefined rules, from identifying trends within the variables, or combinations thereof. It will be appreciated that any number or combination of these steps that lead a user to the first scenario fall within the scope of the present invention.

Once the system presents a first scenario to the user, the user is then able to modify the scenario. For example, the first scenario may present an outcome that is unfavorable, unexpected or undesired by the user. Accordingly, a user may directly modify the outcome of the scenario to a preferred or optimal outcome 224. The system may then use these changes to present a second scenario 226. In the second scenario 226, the system displays the changes to the variables that may be implemented in order to achieve the preferred or optimal outcome 224 set by the user. In an embodiment, the user may also modify the number or types of variables used in the scenario 222. The user may then make further changes to the scenario by repeating steps 222 and 224 in the process. The user may also modify the variables used in the scenario to provide hypothetical variables that may affect the outcome.

The system may present actionable elements with each scenario. Once a preferred or optimal scenario is achieved a user may use the actionable elements to implement the preferred or optimal scenario in a real-world setting 228. By way of non-limiting examples, the actionable elements may connect a user with a third party 230, or the actionable elements may provide instructions from the user to the third parties 230. It is also contemplated that actionable elements 180 may send some or all of the instructions at a time best suited to the implementation. In an exemplary embodiment, the actionable elements may print, save, e-mail instructions, connect a user with other tools, third parties, send instructions to third parties, or combinations thereof, to implement the scenario 232, as described herein.

By actioning the actionable elements the user is indicating that a preferred or optimal scenario has been achieved. The system may then store the variables, settings, or related data that define the preferred or optimal scenario to a relational database 236 where the data may be stored, parsed and analyzed by a predictive scenario engine 238. The system may then use these secondary variables to further refine or optimize the scenarios presented to the user. The system may also share the secondary variables with third parties 240. The system may also use the secondary variables to provide time appropriate advertising, notifications, or alerts to the user 242. It is also contemplated that primary and tertiary variables may also be used in this way.

FIGS. 3A-3E show exemplary embodiments of screen shots from the system of the present invention. In an exemplary embodiment, the screen shot shows a user interface 300. The user interface 300 may be, by way of a non-limiting example, a Home Screen, Dashboard or user account. In an exemplary embodiment, the user interface 300 may be a dedicated page outside of the home screen or dashboard. In an exemplary embodiment a user 170 may establish an account. When establishing an account the user may be asked to enter data directly into the system. By way of non-limiting examples, such data may include: Personal data such as name, address, phone numbers, e-mail addresses, occupation, date of birth, social security number, or the like; Demographic data such as gender, age, ethnicity, religion, or the like; Geographic data as present location, or the like. In addition, the user may be asked to allow the system 100 access to third parties that have data stored which is either directly or indirectly pertinent to the user. By way of non-limiting examples, such third party data may include: social security numbers, email accounts, DMV records, bank accounts, credit cards, credit reports, credit scores, social media accounts, or the like. The account may be protected by password, PIN, fingerprint recognition, facial recognition, or the like, and provides access to a personalized Home Screen or Dashboard, for example user interface 300, where pertinent information may be summarized and displayed by the system. The user interface 300 may be customizable based on settings and data provided by the user, and/or based on the data provided by the system. It is contemplated that the user interface 300 may be connected in series or in tandem with one or more alternate user interfaces similar to that of user interface 300 and that any combination of one or more user interfaces 300 is contemplated to fall within the scope of the present invention.

The user interface 300 may provide various customizable information windows 302. These windows may, for example, provide various scenario outcomes. These scenarios may be scenarios chosen by the user, or provided by the system based on predetermined parameters, rules or analysis by the predictive scenario engine 190. The system may modify these predetermined parameters or rules based on trends identified by the system from the variables. The windows may provide various gamified user interfaces 350 where a user may easily modify or adjust the outcomes of various scenarios. The user interface 300 may also provide various actionable elements 380. These actionable elements may be used to connect a user with various third parties.

The interface 300 may also provide temporally appropriate or relevant advertisements or notifications 360. The system may use the primary, secondary, and tertiary variables to determine appropriate third parties that can advertise to the user. As discussed herein, it will be appreciated that the advertisements may also include advertising directed to features found within the system as well as from outside the system, third parties, or the like. The system may also assess appropriate goods or services that a user may be interested in based on the scenarios a user has generated. For example, the system may use previously actioned scenarios to determine possible future events or real-time events that a user may require. Accordingly, the system will provide advertisements for goods or services to the user at a time that is most appropriate. The time that is most appropriate may be immediately, in real-time, at a time in the future that the system deems would be most pertinent to the user, or the like. In this way only the most pertinent advertisements are provided to the user thereby lowering consumer fatigue and increasing the likelihood of a user using the advertised link. It is contemplated that these advertisements may also be presented on other interfaces within the system, at various relevant stages within the process, as well as via various forms of communication outside of the system while still remaining within the scope of the present invention. By way of a non-limiting example, the advertisements may be provided as part of an email, text message, or notification within an application. In an exemplary embodiment, the advertisements may be provided as part of the users social media profile, or as part of a website that the user is visiting, or the like.

In an exemplary embodiment, the system provides notifications in the form of alerts 370. The system may monitor primary, secondary, tertiary variables, or combinations thereof and provide alerts 370 to the user based on a set of predetermined rules, trends derived from variables, or combinations thereof. These alerts 370 may notify the user of any changes detected in the primary, secondary, tertiary variables. The alerts 370 may also provide one or more gamified scenarios based on the changes detected. These gamified scenarios may be similar to those discussed herein. These alerts 370 may, for example, notify a user of any change detected in one or more of the primary, secondary, tertiary variables, before, during, or after the change has taken place. The system may then provide a gamified scenario based on this change where a user may see what effect this change may have. Similar to the gamified interfaces discussed herein, the gamified scenario may show the expected impact of this change. The user may then choose to modify the outcome of the scenario to a preferred scenario. The system will determine what other changes the user should implement in order to achieve the new outcome.

In an exemplary embodiment, the alerts 370 notify a user of any change detected that may affect an outcome of a previous scenario. These alerts 370 may occur either before, during or after the scenario has been implemented in a real-world setting. These alerts may be presented to the user by way of a variety of communication means. By way of non-limiting examples, these communication means may include emails, phone calls, SMS messages, text messages, pop-ups or windows within the interface, pop-ups or windows within the users' web browser or social media site or the like, direct mailing, or the like. In an exemplary embodiment, the system may detect an action by the user by way of primary, secondary, tertiary variables, or combinations thereof. The system then determines by way of predetermined rules, trends derived from primary variables, secondary variables, tertiary variables, or combinations thereof that the action taken by the user may prevent a scenario from achieving a preferred outcome. The system may then provide an alert 370, or similar notification to the user. The alert 370 may for example provide advice regarding whether or not to continue the action. The alert 370 may for example provide the affected scenario and allow the user to modify the scenario. The alert 370 may for example provide a different scenario that now incorporates the previously implemented scenario as well as the new action affecting it so that a user may take steps to determine a new outcome. In an embodiment, alerts 370 may provide rewards or encouragement to the user in order to help achieve the preferred outcome. Alerts 370 may show how much change in the primary, secondary, tertiary variables has already been achieved, and how much is left to change before the preferred outcome is achieved. The rewards or encouragement provided by the system may include medals, trophies, videos, gifts, or similar rewards provided as part of the system. Such rewards may be displayed as part of the user's profile and may serve to motivate continued change in a real world setting in order to achieve the implemented preferred outcome, or continued usage of the system in general. It will be appreciated that other alerts, actions, advice, tools, gamified scenarios, advertisements, notifications or the like may be provided to the user by way to the Alert 370 and fall within the scope of the present invention.

Based on the primary and tertiary variables obtained by the system, the system may then utilize secondary variables to provide various scenarios that are most pertinent to the user. In an exemplary embodiment, a user may select specific pre-determined scenarios provided by the system. The system may also provide customizable scenarios to the user.

Figure 3A:
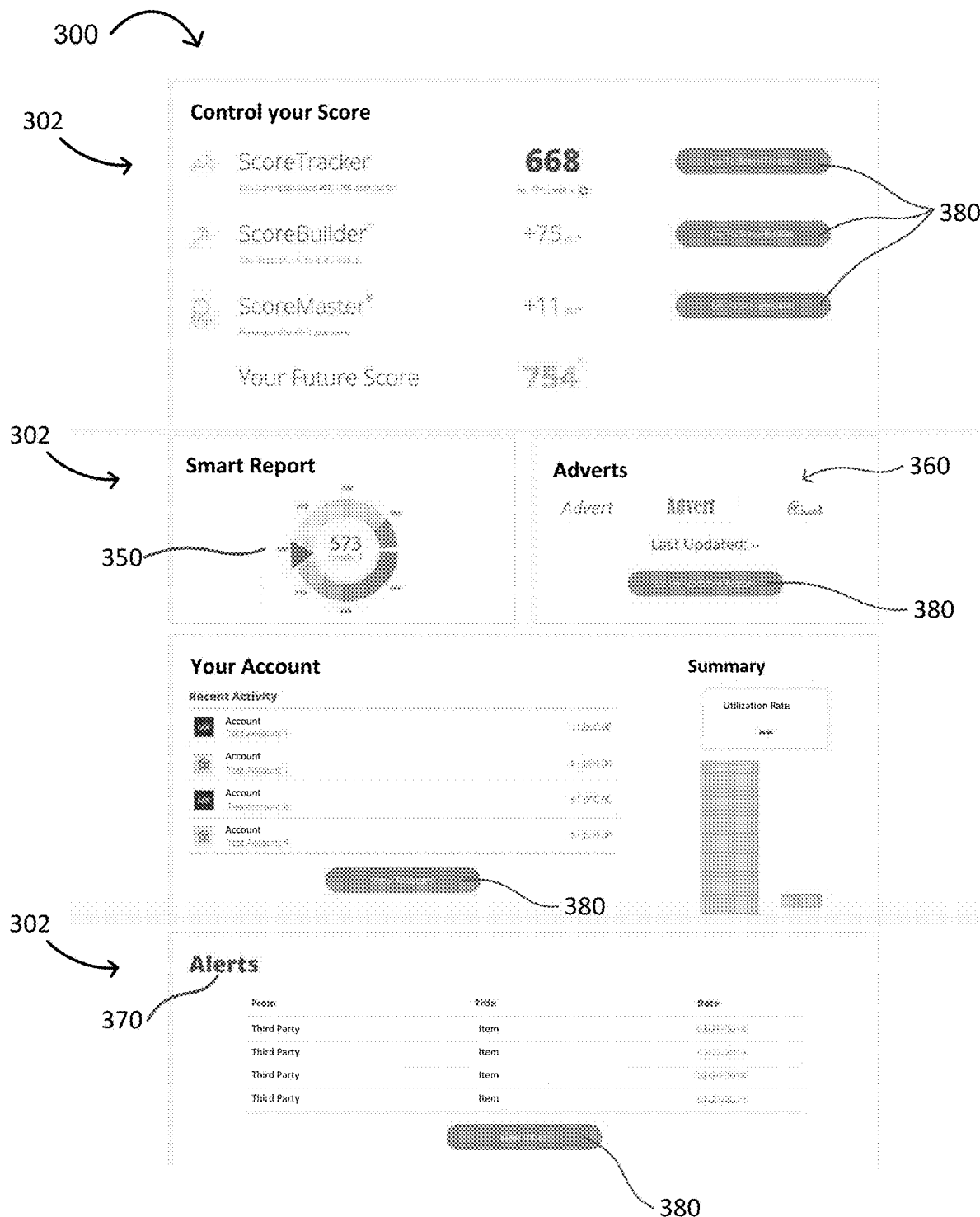
FIG. 3A illustrates an exemplary gamification interface of the system, in accordance with the present disclosure.
Figure 3B:
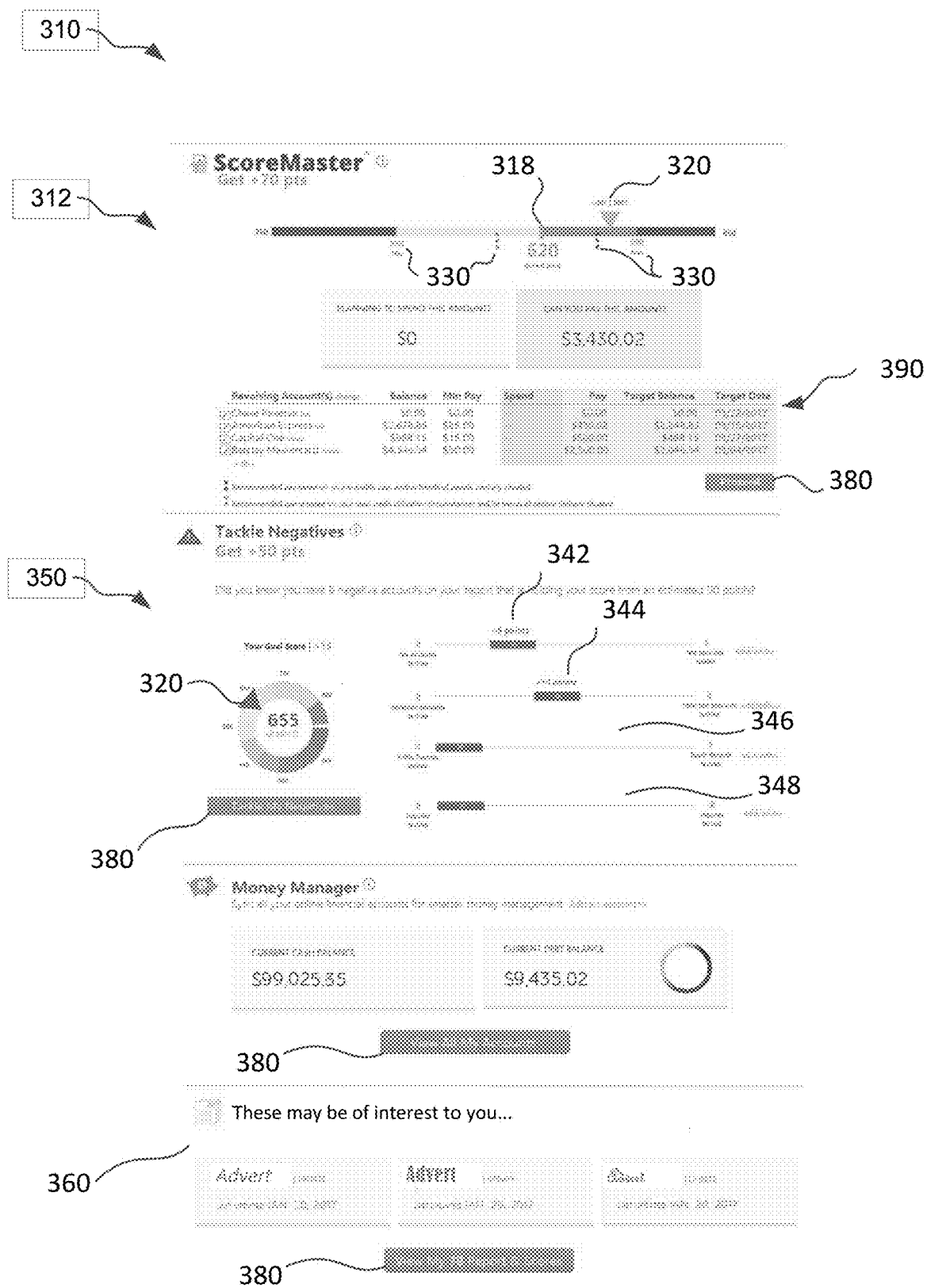
FIGS. 3B-E illustrate exemplary gamification interfaces of the system, in accordance with the present disclosure.

FIGS. 3B-3E show exemplary embodiments of screen shots from the system of the present invention. The exemplary screen shots show a user interface 310. The user interface 310 may be, by way of a non-limiting example, a Home Screen, Dashboard or user account similar to that of 300, and linked with a user account similar to embodiments described herein. The user interface 310 may include various gamified scenarios 312, 350 that may be presented directly on the home screen. Similar to embodiments described herein, the gamified scenarios 312 may include potential outcomes of the scenario 320 shown as a gamified user interface. As described herein, a user may custom build the scenario, choose from a library of predetermined scenarios that may use predetermined rules, or the system may use primary, secondary, tertiary variables, or a combination thereof to pre-empt the one or more scenarios that would be most pertinent to the user. The system may use trends identified by the system from the primary, secondary, or tertiary variables to modify the rules and better determine the most appropriate scenario The system may use one or more of the primary, secondary, and tertiary variables that are most pertinent to the scenario and determine possible outcomes to the scenario. As shown in FIG. 3B, the potential outcomes 320 of the scenarios 312, 350 are shown as a gamified graphical interfaces such as slide bars or wheels, although other gamified graphical interfaces are contemplated as described herein. In an exemplary embodiment, the gamified graphical interface may include a primary marker 320 denoting a specific outcome, while one or more secondary markers 330 denote alternate possible outcomes, ranges of possible outcomes, recommended outcomes, ranges of recommended outcomes, or the like. It is contemplated that any number of primary or secondary markers 320, 330 may be used to denote various outcomes or ranges.

Figure 3C:
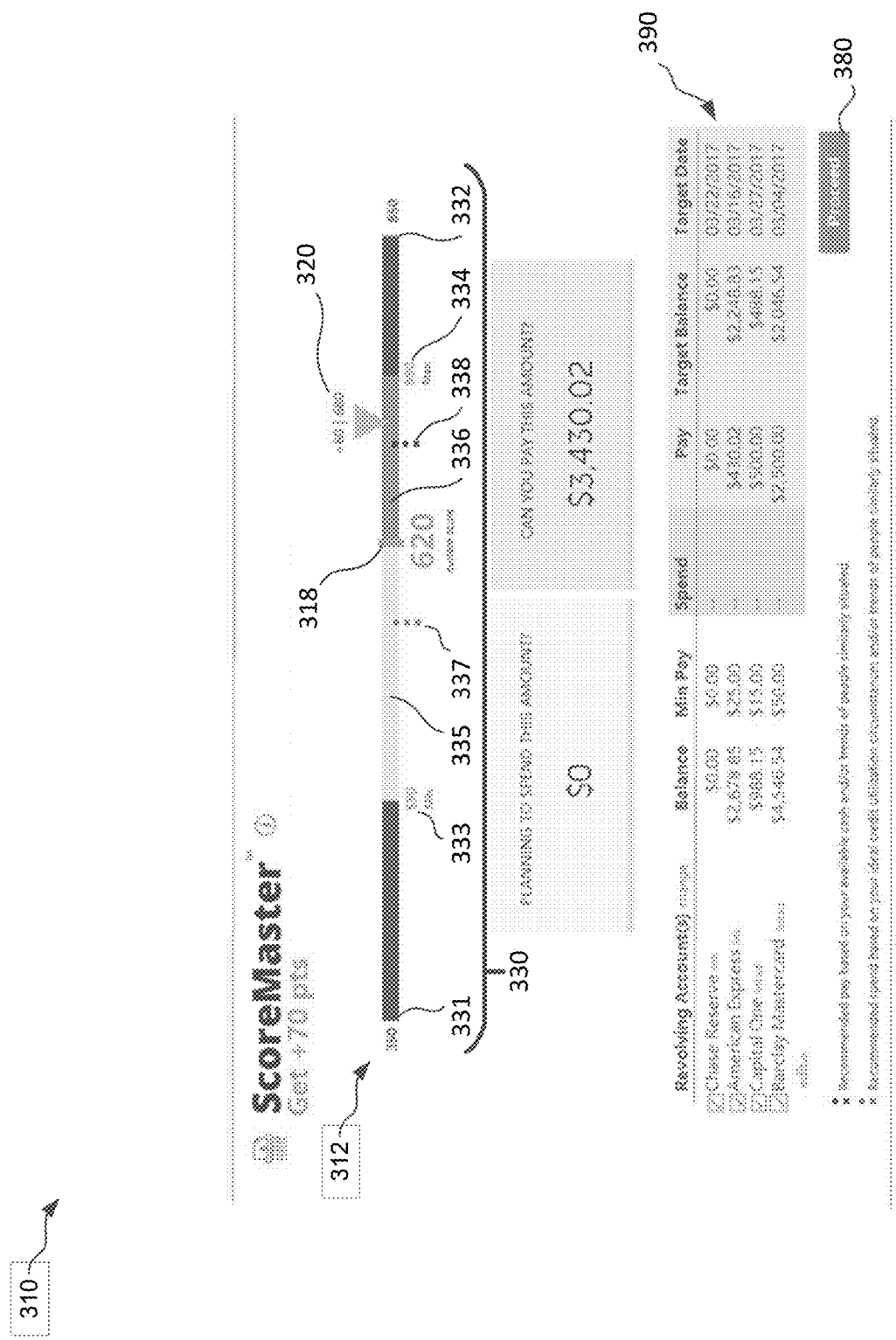

As best seen in FIG. 3C, and by way of a non-limiting example, a first primary marker 318 may denote the current outcome based on the variables initially inputted into a scenario. A second primary marker 320 may denote a preferred or optimal outcome as initially determined by the system using secondary variables. The system may allow the user to move the second primary marker 320 to a preferred or optimum outcome.

In an exemplary embodiment, the system provides one or more secondary markers 330. These secondary markers may indicate points or ranges showing minimum and maximum possible outcomes 331, 332, minimum and maximum achievable outcomes based on the variables in the scenario 333, 334, the outcomes most recommended, or most frequently chosen 337, 338, or the like. The secondary markers may be based on, for example, previous behavior of the user, of a group of users, other variables, or the like. The user interface 310 may use various colors, textures or other indicators to denote various ranges 335, 336. In an exemplary embodiment, the secondary markers 330 may denote different ranges by which the preferred outcome 320 may be modified, range of outcomes that are most favorable to the user, previous behavior of the user, or similar users when faced with a similar scenario, such as, for example, a range of outcomes that are most commonly selected by other users in the same demographic, or the like. In this way the scenario 312 may provide guidance to the user. In exemplary embodiments, the user interface 310 may show additional information 390 such as the variables used in the scenario, the degree of change for each variable that may be necessary to achieve the preferred outcome 320, or the like. In exemplary embodiments, the primary and secondary markers 320, 330 may include additional information, such as for example, specific numeric values detailing the outcome, ranges, or other quantitative or qualitative information.

Figure 3D:

In exemplary embodiments, and as best seen in FIG. 3D, a combination of gamified graphical interfaces 350 are used. These may, for example, highlight how certain variables have a greater impact on the preferred outcome than others. For example, the combination gamified interface 350 shows a potential outcome or current situation indicated by primary marker 320. The user may move the primary marker 320 to a preferred outcome and the associated sliders 342-348 may show the relative changes required of the different variables, or groups of variables, used in the scenario to show how the outcome 320 may be most efficiently achieved. For example, the first slider 342 may highlight to a user that changing all three of these particular variables may only achieve half as much improvement towards the desired outcome compared with changing the two variables of the second slider 344. Similarly, changing the one variable of the slider 346 or the two variables of 348 will have no effect on achieving the preferred outcome. Furthermore, for example, having provided a first preferred outcome, the user may not want to modify the particular variables represented by slider 342. Accordingly, the user may choose to further modify the outcome of the first scenario or modify the variables 342. In doing so, the system may provide a second scenario in response to these modifications. In this way the gamified scenarios allow a user to achieve the most efficient preferred outcome.

Figure 3E:
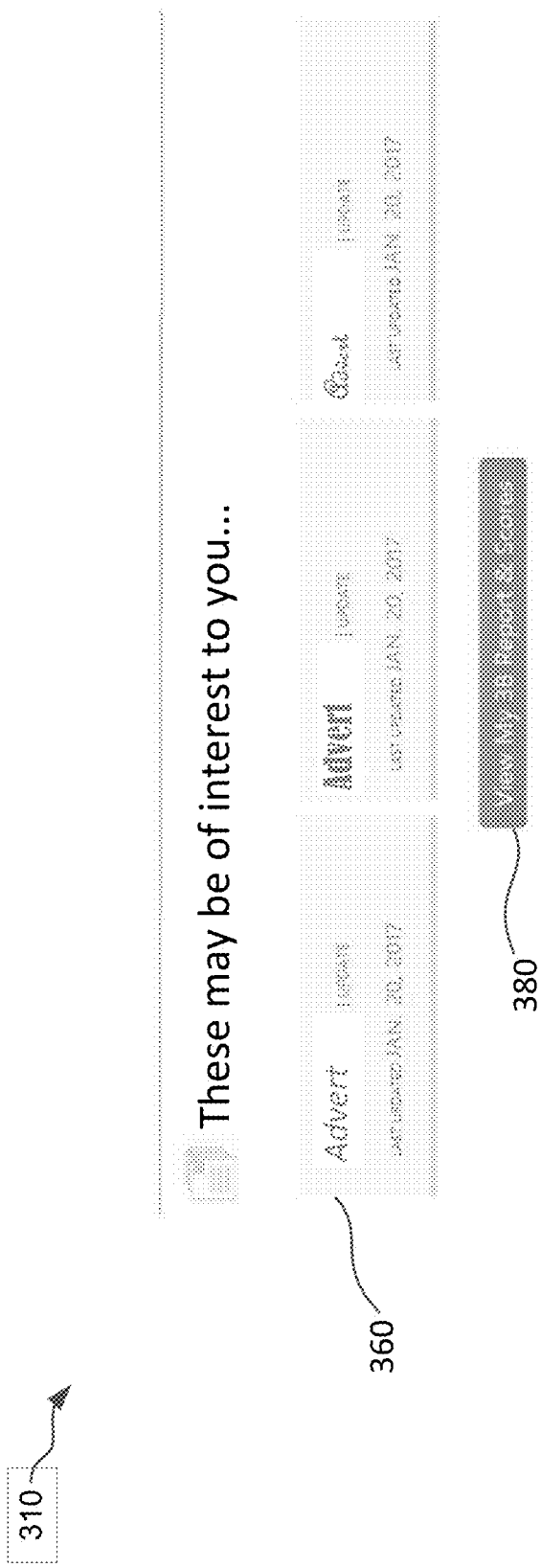

In exemplary embodiments, the scenarios 310, 312, 350 include actionable elements 380 which allow a user to implement the preferred scenario or outcome in a real-world setting as described herein. As best seen in FIG. 3E, the gamified user interface 310 may also include temporally relevant advertisements 360 based on the users current or previously implemented scenarios, primary, secondary, tertiary data, or combinations thereof. The system may use these scenarios or variables to establish which goods or services may be most relevant the user. The system may also determine when these goods or services would be most relevant to the user. In an exemplary embodiment, the system may determine that to implement a preferred scenario certain instructions may need to be implemented immediately, whereas a second set of instructions may need to be implemented once the first set of instructions have taken effect. Accordingly the system may prevent the advertising of various goods and services that are relevant to the second set of instructions until the first set of instructions have taken effect. In this way the user is prevented from experiencing consumer fatigue and the advertisements are presented when they are most effective. It is contemplated that the advertisements may be provided to the user by a variety of means that fall within the scope of the present invention. Such means may include, but not limited to, emails, phone calls, SMS message, text message, pop-ups or windows within the interface of the system, pop-ups or windows within the users web browser, within social media sites, direct mailing, reactive billboards, or the like.

Figure 4A:
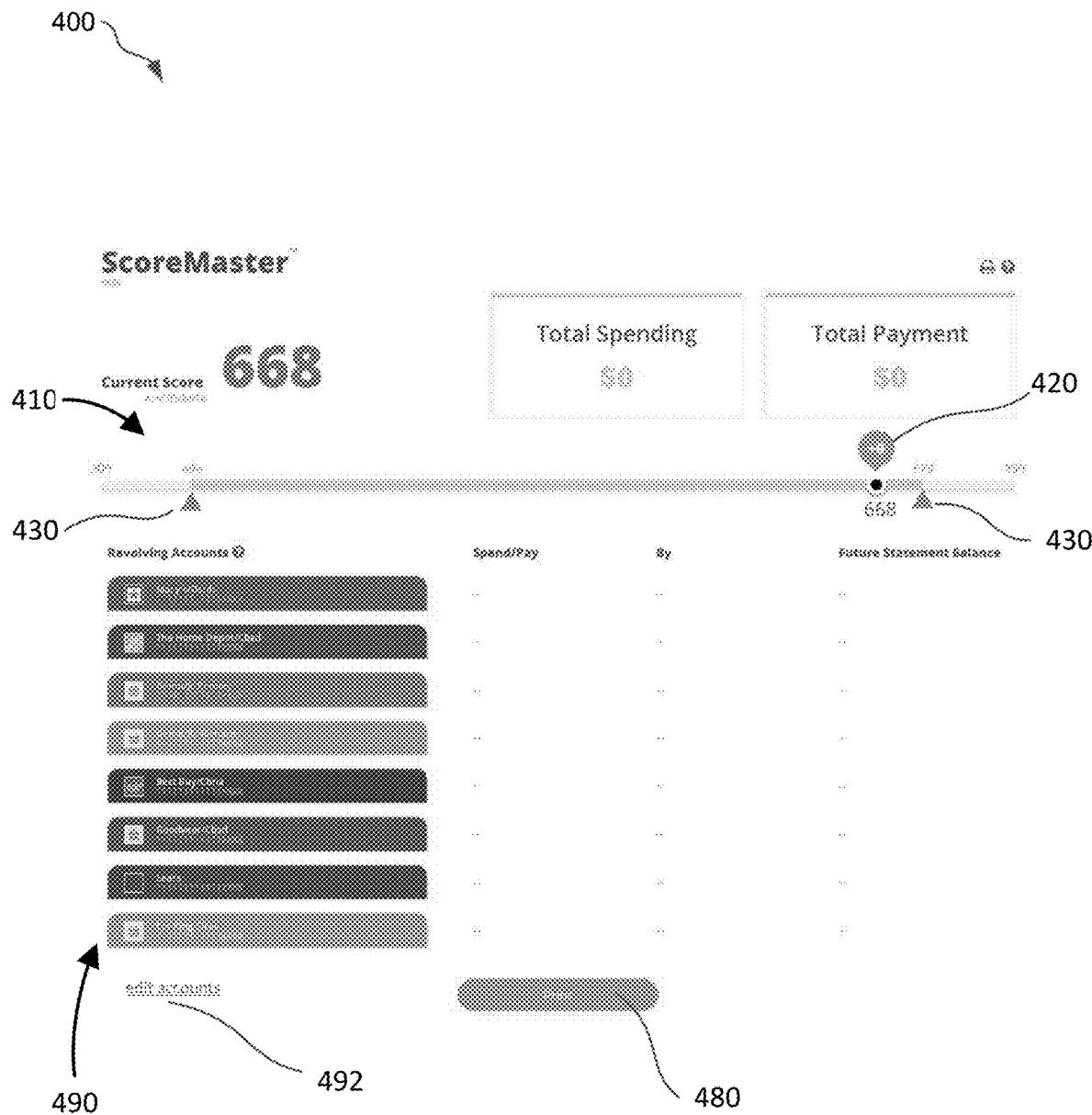
FIG. 4A illustrates an exemplary gamification interface of the system, in accordance with the present disclosure.

FIG. 4A shows an exemplary embodiment of a gamified user interface for a given scenario 400. As discussed herein, a user may custom build the scenario, choose from a library of predetermined scenarios, or the system may use trends, secondary variables, or the like, to pre-empt the one or more scenarios that would be most pertinent to the user. It is contemplated that primary and tertiary variables may also be used. It will also be appreciated that alternate gamified graphical interfaces also fall within the scope of the present invention, including slide wheels, temperature gauges, charts, or the like. In addition the system may use secondary variables to determine more accurate outcomes for the primary and secondary markers 420, 430. It is also contemplated that primary or tertiary variables may also be used.

The system may use one or more of the primary, secondary, and tertiary variables that are most pertinent to the scenario and determine possible outcomes to the scenario. As shown in FIG. 4A, the potential outcome of the scenario 410 is shown as a gamified graphical interface. In an exemplary embodiment, gamified graphical interface of the outcome 410 may be a slide bar with a primary marker 420 denoting a specific outcome, while one or more secondary markers 430 denote alternate possible outcomes, or denote a range of possible outcomes. It is contemplated that any number of secondary markers 430 may be used to denote various ranges. By way of a non-limiting example, a first set of secondary markers 430 may denote a maximum or minimum possible range of outcomes, while a second set of secondary markers 430 may denote a range of outcomes that will have, for example, a negligible impact on a particular variable. It is contemplated that any number of such markers may be configurable within the scenario either by the system or by the user. In an exemplary embodiment these markers may show points or ranges that include suggested or most likely outcomes, recommended outcomes, and may use the primary, secondary, tertiary variables or combinations thereof of the user or other users to determine these points or ranges. These points or ranges may be determined by way of a set of predetermined rules, trends derived from primary, secondary, tertiary variables, combinations thereof, or the like. It will be appreciated that primary and secondary markers 420, 430 may include arrows, triangles, bubbles, or any similar icon, shape, color, color change, or color gradient to indicate the markers or ranges. It will also be appreciated that alternate gamified graphical interfaces also fall within the scope of the present invention, including slide wheels, temperature gauges, charts, or the like. In addition the system may use secondary variables to determine more accurate outcomes for the primary and secondary markers 420, 430. It is also contemplated that primary or tertiary variables may also be used.

The gamified user interface 400 may also show one or more variables 490 that were used in determining the outcome, or the variables that have the most significant effect on the outcome. The user may be able to add or remove specific variables to be used in the scenario, this may be provided directly within the scenario or by way of a link 492 to a sub-screen. It is also contemplated the user may set 'default' preferences on which variables are to be included or ignored from the scenario. For example a user may pre-select certain variables to be included or excluded from one or more types of scenarios. Various combinations of which are contemplated to fall within the scope of the present invention.

In an exemplary embodiment, a user can alter the outcome of the scenario by moving the primary marker 420 to a desired position. In response to the new position, the system may present a second scenario which may show different variables involved in the scenario, changes to the existing variables involved in the scenario, or a combination thereof that are necessary to achieve the new outcome selected by the user. Based on the second scenario, a user may further adjust the primary marker 420 to select a new outcome, wherein the system will provide a third scenario which may show different variables involved in the scenario, changes the existing variables involved in the scenario, or a combination thereof that are necessary to achieve the new outcome selected by the user. The user may continue as such until the preferred or optimum scenario or outcome, scenario-n has been achieved.

It is contemplated that the scenario may also allow a user to amend the number, type, or value for one or more variables used in the scenario. In response to which the system may present a subsequent scenario with a new outcome based on the amended one or more variables. In an exemplary embodiment, the gamified user interface 400 provides one or more actionable elements 480. Once a preferred or optimum scenario is achieved a user may action the actionable element 480 to implement the scenario in a real-world setting.

By way of a non-limiting example, the system may collate, analyze and display various personal, psychographic, economic and demographic variables data for a user. The system may determine that there are enough variables to provide, for example, a gamified credit score scenario and may present the credit score scenario to the user on the home screen or dashboard 300. It is also contemplated that the scenario may be presented on a dedicated page outside of the homes screen or dashboard 400. In an exemplary embodiment, the scenario may be presented by way of a communication interface outside of the system such as an e-mail, text message, social media profile, or the like. In an exemplary embodiment, the user may choose a credit score scenario from a library of scenarios. If the user chooses the credit score scenario, the system may request further primary data or access to further secondary or tertiary variables before a gamified credit score scenario can be run. The system may then provide a first scenario in the gamified credit score scenario. The first scenario may show a gamified user interface 410 that shows all possible credit scores for a user on an interactive slider or similar graphical interface. The secondary markers 430 may show the maximum and minimum possible credit scores for a user, or may show ranges of outcomes, or may show ranges of outcomes previously achieved by other users in a similar scenario with a similar demographic. It will be appreciated that similar uses for the secondary markers fall within the scope of the present invention. The primary marker 420 in the first scenario may show the current credit score for the user, another primary marker may show the optimum credit score for the user based on the current variables in the system.

The exact positions for the primary and secondary markers may be initially determined based on primary variables entered by the user, or directly from tertiary variables provided by one or more third parties, such as for example various credit reporting agencies. In an exemplary embodiment, the system may leverage secondary variables to determine the typical credit score for a user with similar personal, psychographic, economic and demographic variables. In an exemplary embodiment, or in addition to, the system may use some or all of the primary, secondary and tertiary variables to determine the most accurate credit score for a user. The system may also provide one or more variables 490 that were used to determine the credit score, for example the credit cards, bank accounts, tangible assets, or the like used to determine the scenario. In an exemplary embodiment, the system may provide the variables that have the most significant effect on the credit score. For example, system may display one or more credit cards with a high utilization percentage, a store card with a high APR, a late payment on an auto loan, or the like.

The user may then choose to alter the primary marker 420 to an optimum or preferred credit score. It is important to note that the optimum or preferred credit score may not be the maximum possible credit score obtainable by a user. Further, the optimum or preferred credit score may also be less than the users current credit score. Once an optimum or preferred credit score is selected the system may display the changes to the pertinent variables that are required to achieve the optimum or preferred score.

In exemplary embodiments, a user may require a down payment on a house, accordingly the user may modify the outcome to decrease the preferred credit score to a level that still remains within a certain loan bracket, as indicated by secondary markers. The system may then show which variables need to be adjusted in order to decrease the credit score to the desired level. In doing so, funds that were previously dedicated to paying down loans to achieve a maximum possible credit score, are now available for a down payment. In exemplary embodiments, a user may also choose to increase the credit score by only a few points in order to qualify for a mortgage, the system may display the actions necessary to facilitate such a change, such as pay off a given amount of one or more credit cards, close a particular account, or the like. The system may also factor in that certain actions have a greater effect on a user's credit score, in this way the most efficient way of achieving a desired credit score may be achieved.

It is also contemplated that certain actions will have a greater effect on an outcome than others. Further, the synergistic effects of two or more variables may have a greater impact on the outcome. Accordingly, the system will determine these differences in order to achieve the optimum or preferred outcome in the most efficient way possible. The system may determine these differences based on a set of rules, these rules may be predetermined or may be modified based on trends determined from primary, secondary, or tertiary variables, or combinations thereof. For example, a user may also require changes to available cash and may contemplate an acceptable decrease in credit score to facilitate this. In which case a user may move the primary marker to a lower credit score and system will determine and display which variables may be modified to allow such a change. It is further contemplated that once the primary marker has been set to a desired credit score, the user may want to further fine tune the scenario but adjusting specific values for the variables should a given value be too high or low.

In this way a user is able to adjust, manipulate, or modify a scenario until the user has achieved the optimum or preferred scenario. Accordingly, the various personal, psychographic, economic and demographic variables have been gamified in a meaningful way to the user. Once the optimum or preferred scenario has been achieved the user may action the actionable element to implement the changes presented in the credit score scenario. These actionable elements may include printing, saving, sending, emailing a list of instructions for a user to carry out. In an exemplary embodiment, the actionable element may connect the user with one or more third parties, such as the bank accounts or credit cards, in order to implement the payments directly, the actionable element may also connect the user with a 'coaching' program or tutorial or a live sharing of the tool with other third parties. By way of a non-limiting example, the actionable elements may connect a user directly with a banks bill pay system. In an exemplary embodiment, the actionable elements may connect a user with additional tools and provide instructions to these tools to implement the changes at an appropriate time. By way of non-limiting examples, these tools may include a budgeting tool that may be part of the system or tools that may be external to the system, such as for example, MINT.COM®, or the like. It is also contemplated that the actionable elements may connect the user with other tools, either internal or external to the system, that are most pertinent to implementing the specific scenario, depending on the type of scenario. In an exemplary embodiment the actionable element may also connect a user to a tool for producing a Gantt chart that shows the steps involved in implementing a building project. It also is contemplated that the actionable elements may either connect a user with a third party or may send instructions on behalf of the user to the third party for the third party to implement. It is also contemplated that all or part of the implementation instructions may advantageously be disseminated at one or more given time frames in the future. Accordingly when the actionable element is actioned, the system will determine which parts of the scenario need to be actioned and when and will schedule instructions to be disseminated at the appropriate times in order to implement the scenario.

In an exemplary embodiment, once the preferred or optimum scenario has been achieved the system determines which advertisements may be temporally most relevant to the user. It is contemplated that temporally appropriate advertisements may not be restricted to after the scenario has been actioned. For example, the system may determine that the user is looking to buy a house, either from the type of scenario being run or by the variables used in a scenario, or combinations thereof. The system may determine that the user is not in a position to buy a house yet, instead the user is in need of a better auto loan to achieve a desired credit score to achieve desired mortgage rate. Accordingly the system may initially provide advertisements for competitive auto loans. Once the scenario and the system is able to see that an auto loan will be applied for, the system may restrict the advertisements from auto loan companies and instead provide advertisements for house listings. In an exemplary embodiment, the user may generate a scenario to set a desired credit score, and the system provides actionable elements to achieve the desired credit score. Once the scenario has been implemented in a real-world setting the user may then carry out one or more subsequent actions that prevent the preferred outcome of the scenario from being fulfilled. The system may provide an advert, pop-up notification, or similar notice either before during or after the one or more subsequent actions informing the user that these actions may prevent the preferred outcome of the scenario from being fulfilled. The advert, pop-up notification, or similar notice may also provide the user with alternate or further actions that either may not prevent the preferred outcome of the scenario from being fulfilled or may offset the subsequent actions effects on the preferred outcome of the scenario. Although these are highly simplified examples, it will be appreciated that any number of third parties, variables, or scenarios, or combinations thereof may be used to provide temporally appropriate advertising to the user. In this way consumer fatigue is reduced since only the most relevant advertisements are presented to a user at a given time, further the effectiveness of advertisements is maximized.

Figure 4B:
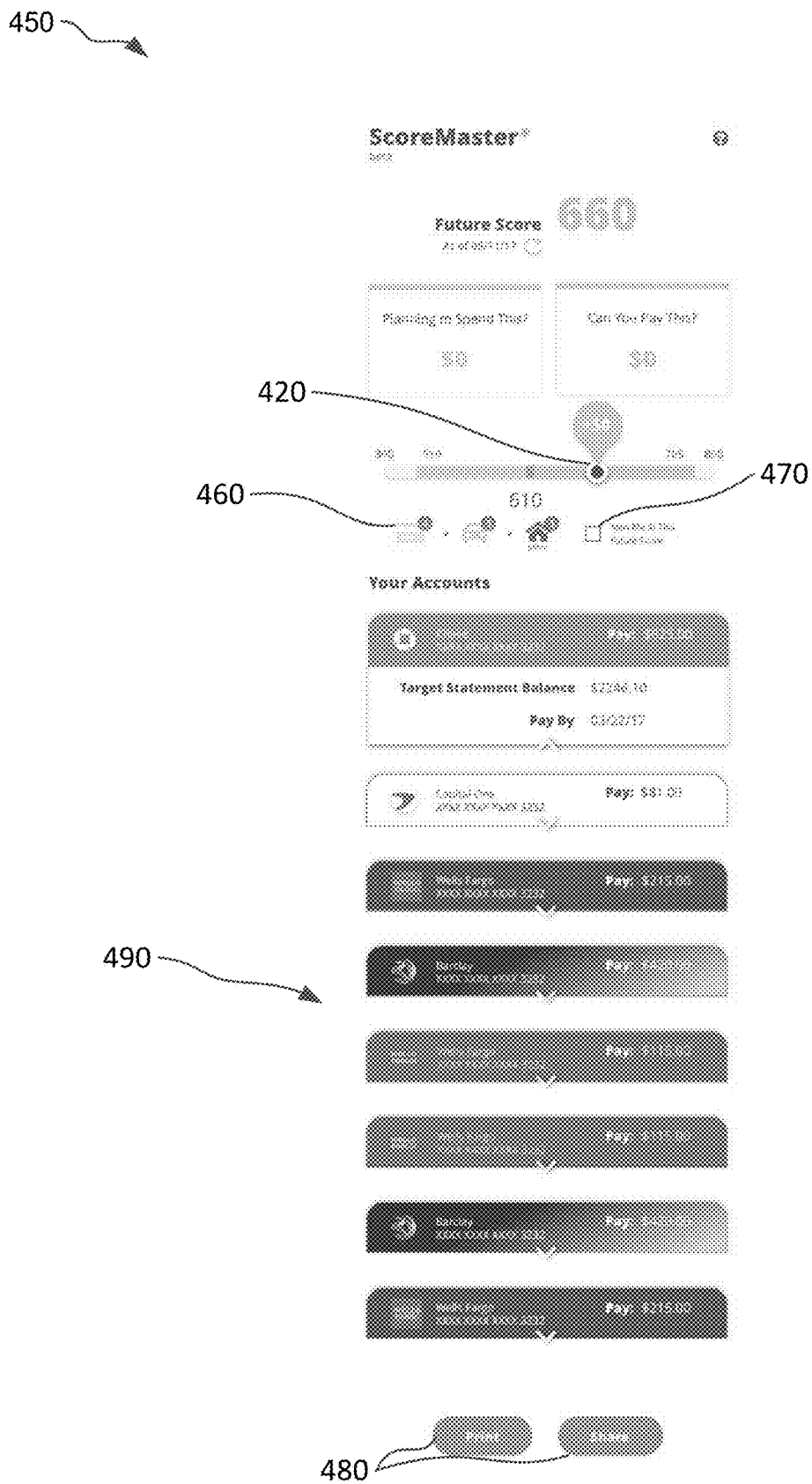
FIG. 4B illustrates an exemplary gamification interface of the system, in accordance with the present disclosure.

In an exemplary embodiment, as shown in FIG. 4B, a gamified user interface for a scenario is provided as a mobile application (hereinafter, "app") interface. A scenario 450 may provide an adjustable preferred outcome 420, as described herein. The system may further provide one or more icons 460 associated with the preferred outcome 420. Each of these icons 460, may be associated with one or more advertisements for goods or services 360, notifications or alerts 370, or actionable elements 380, 480. The icons 460 may connect a user with goods or services associated with one or more third parties, or implement certain actions in a real-world setting. In an embodiment, as the user modifies the preferred outcome 420, the system may dynamically determine which goods or services become available, or no longer become available. Accordingly, the system 100 may display different types of icons 460 with different associated numbers depending on the preferred outcome selected by the user. In an embodiment, having reviewed the potential goods and services available, a user may choose to further modify the preferred outcome 420. Accordingly, as described herein, the system may provide further scenarios including what actions are required to be taken in a real world setting in order to achieve the modified outcomes and therefore achieve the associated goods and services represented by icons 460. Advantageously, these icons 460 further help the user by interpreting how a preferred outcome may relate to various goods and services that may be beneficial to the user. Accordingly, the user be able to determine a scenario that provides the optimum outcome.

The system may also provide a user with a notification option 470 associated with the icons 460. By selecting the notification option 470, the user may indicate they wish to receive alerts or notifications 360 directed to the preferred outcome and associated goods and services that may be available once the preferred outcome is achieved. For example, once the notification option 470 has been selected, and a scenario has been implemented, the system may alert the user when the preferred outcome 420 is being approached, has been reached, or a combination thereof. The system may also alert the user when certain goods or services become available as a result of approaching or achieving the optimum outcome. The system may also provide alerts 360 directed to various actionable elements which may be implemented at the appropriate time in order to achieve the preferred outcome of the implemented scenario. As described herein, the scenario may also show the variables used in the scenario 490 and the changes associated therewith in order to achieve the preferred outcome 420, together with actionable elements 480 to implement these changes in a real-world setting.

Figure 4C:
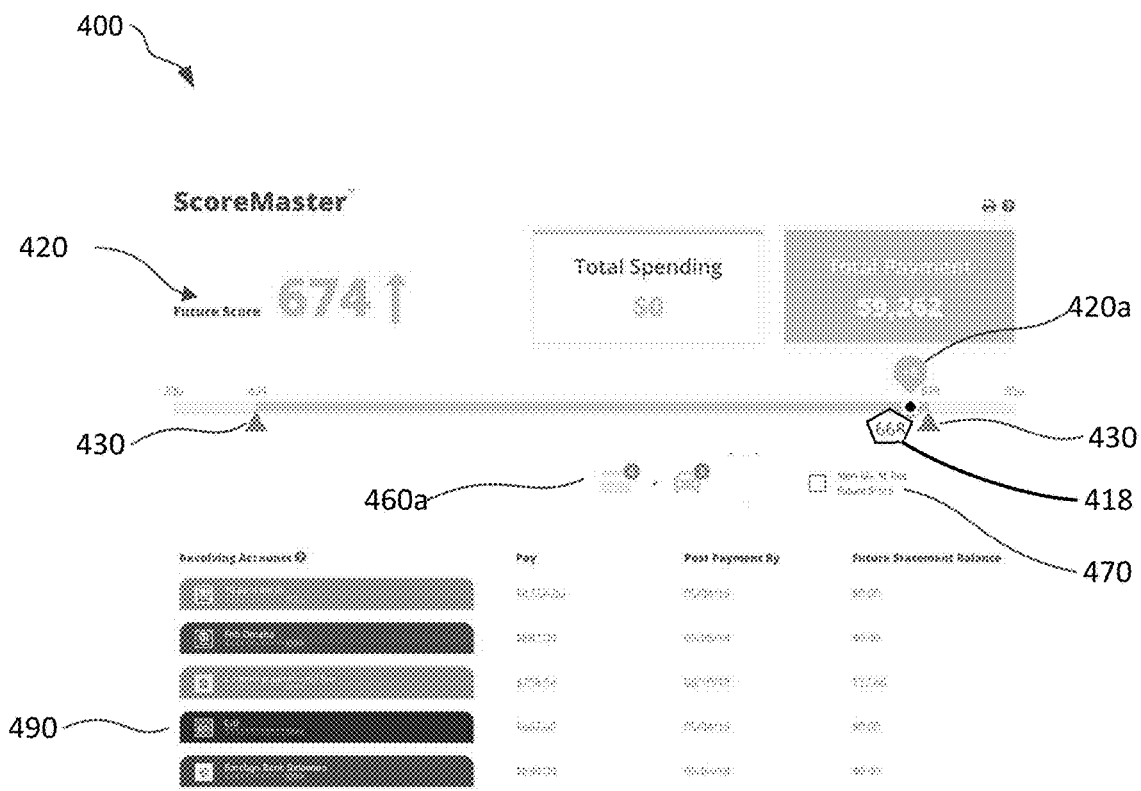
FIG. 4C-E illustrate exemplary gamification interfaces of the system, in accordance with the present disclosure.
Figure 4D:
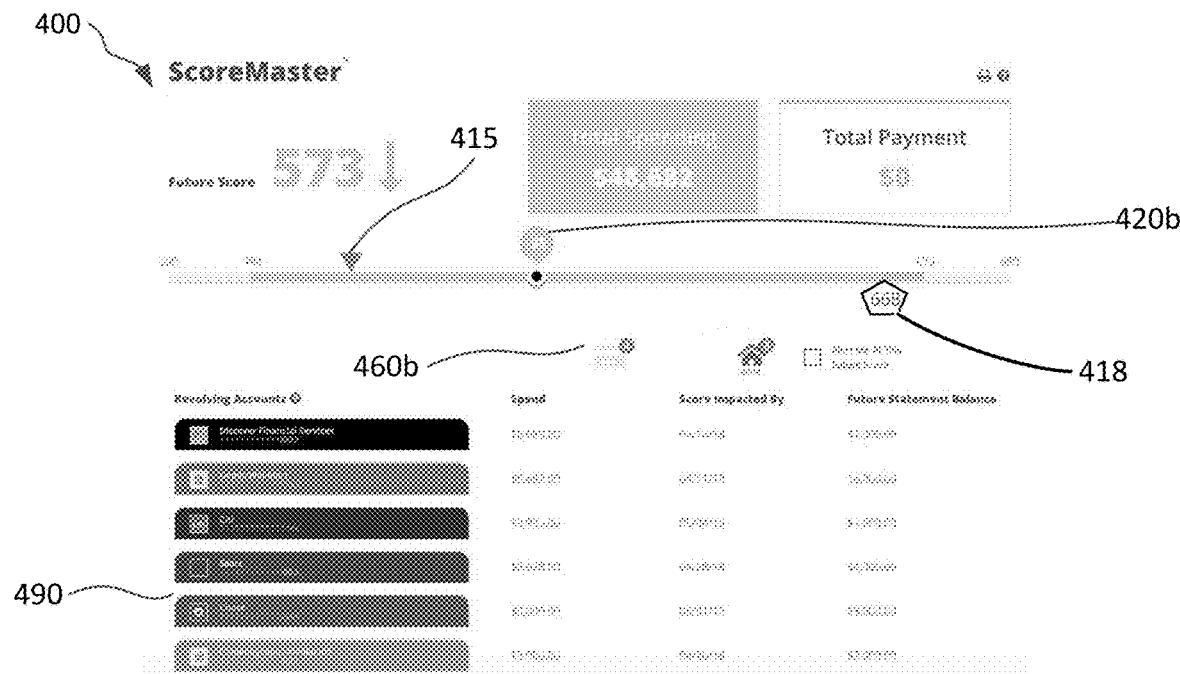

FIGS. 4C-D show embodiments of a gamified user interface 400 for a scenario, showing a current outcome 418 as well as a preferred outcome 420a, 420b. As described herein, the preferred outcomes 420a, 420b may be initially determined by the system from secondary variables and/or may be set and further modified by the user. As a user modifies the preferred outcome (e.g. from 420a of FIG. 4C to 420b of FIG. 4D) different sets of icons 460a, 460b, respectively, may be displayed. The system may determine which goods and services may be available to the user based on primary, secondary, or tertiary variables. The system may determine a given range of outcomes, within which certain goods or services may become available. By selecting any of the icons 460, a user may then access more details about each of these goods and services, either provided by the system, or by providing direct access to a third party. Additional details may be provided, by way of a pop-up display, navigating access to another screen, providing access directly to a third party, or the like. The system may also provide a notification option 470 associated with the preferred outcome 420, as described herein. Further, the system may display the variables 490 and associated changes thereof, which would need to occur in order for the user to achieve the preferred outcome 420.

Figure 4E:
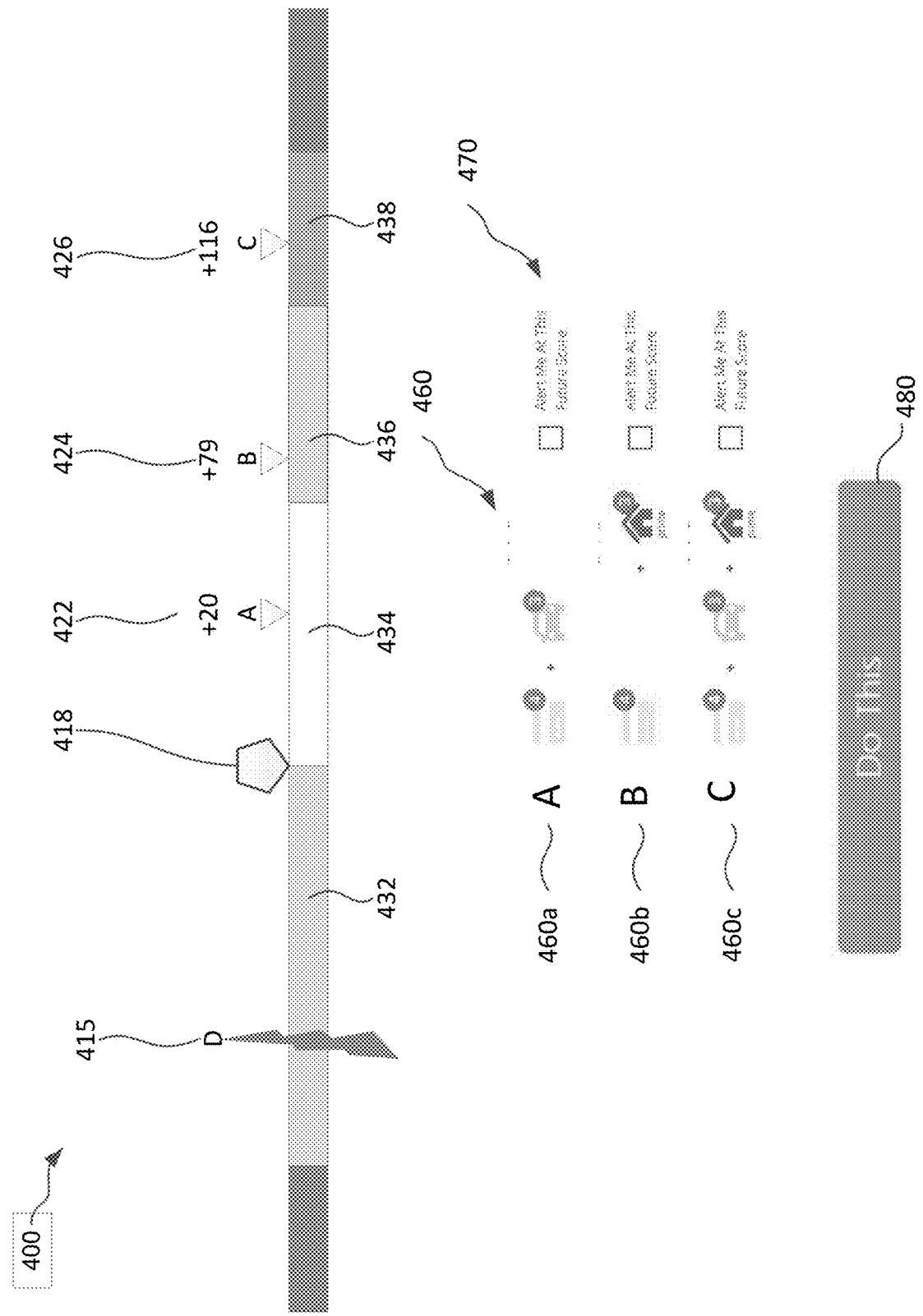

In an embodiment, FIG. 4E shows a gamified user interface 400 with one or more separate primary markers 422, 424, 426 being displayed, and one or more sets of icons 460a-c being associated with the one or more primary markers 422, 424, 426, respectively. The system may provide the current outcome 418 based on the current variables as well as one or more primary markers 422, 424, 426 indicating one or more preferred outcomes. As described herein, these preferred outcomes 422, 424, 426 may be initially determined by the system from secondary variables and/or may each be further modified, independently of one another, by the user. The scenario may further provide one or more sets of icons 460a-c which may be associated with each of the respective outcomes 422, 424, 426. The number and type of icons associated with each outcome may vary and may indicate which goods or services maybe available as a result of achieving each of the outcomes 422, 424, 426.

In an embodiment, each of the different sets of icons 460a-c may be associated with a different 'buckets' or ranges of outcomes, as illustrated by secondary markers, e.g. different shaded bars 432, 434, 436, 438, as determined by the system. For example when one of the primary markers, e.g. marker "A" 422, is placed within a range of possible outcomes indicated by shaded bar 434, icon set 460a may be displayed as associated with marker "A" 422. Similarly, when one of the primary markers, e.g. marker "B" 424, is placed within a range of possible outcomes indicated by shaded bar 436, icon set 460b may be displayed as associated with marker "B" 424. Similarly, when one of the primary markers, e.g. marker "C" 426, is placed within a range of possible outcomes indicated by shaded bar 438, icon set 460c may be displayed as associated with marker "C" 426. It will be appreciated that further sets of icons may be displayed with other ranges, for example range 432, within the gamified user interface 400. Since more than preferred outcomes are indicated, by way of primary markers 422, 424, 426, it will be appreciated that more than one set of icons may be displayed. Further, although the ranges 432, 434, 436, 438 are displayed in the gamified user interface as shaded bars for illustrative purposes, it is contemplated that the system may not display the specific ranges to the user and instead only show the one or more sets of icons associated with the one or more primary markers. In an embodiment, the system may modify the number of possible outcomes associated with each of the ranges. Stated differently, the system may modify the 'size' of ranges 432, 434, 436, 438. Further, the system may modify the types and numbers of icons, and therefore the associated goods and services, which may be displayed when a given primary marker is within one of the ranges or buckets. These modifications may be determined by the system based on the modifications to the primary markers provided by the user, and/or on primary, secondary, and tertiary variables. Although primary markers 422, 424, 426 are shown as increasing from the current outcome, it is also contemplated that one or more of the primary markers 422, 424, 426 may be shown as decreasing from the current outcome 418, e.g. moved to range 432, as discussed herein.

In an embodiment, a user may use the icons 460 to review the potential goods and services available. As described herein, as a user modifies the preferred outcome 420, or preferred outcomes 422, 424, 426, the system may provide further scenarios detailing what actions are required in order to achieve the modified outcomes. In addition, the system may also provide icons detailing the different goods and services associated with the modified outcomes. Accordingly, a user may choose to modify one or more of the preferred outcomes 420, 422, 424, 426 until the desired icons 460 representing the desired goods and services become available. In this way the system may interpret how a preferred outcome will relate to various goods or services desired by the user.

In an embodiment, once a user is satisfied that the optimum outcome has been achieved, the user may choose to implement the scenario by way of actionable elements 480 as described herein. Once a scenario has been implemented in a real world situation, the system may provide temporally appropriate notifications to the user, as the real world situation progresses towards the preferred outcome. For example, the system may provide notifications to a user advising that the user has almost achieved the preferred outcome. The system may offer rewards within the system, for example, medals, points, trophies, encouragement, avatars, or the like. Where scenarios may include multiple preferred outcomes, the system may provide alerts or notifications 370 indicating which outcomes have already been achieved and how close the user is to achieving the next preferred outcome. In this way the system may continue to motivate the user's real world actions to achieve the preferred outcome or outcomes, while the scenario is being implemented.

It is contemplated that once a scenario has been implemented, but before a preferred outcome of the scenario has been achieved, there may be a change in the primary, secondary, or tertiary variables that may be detrimental to achieving the preferred outcome. Such changes may require further action from the user, either by modifying the variables in the scenario or by modifying the preferred outcome of the scenario. Accordingly, the system may provide alerts or notifications 370, to a user, advising of possible actions that need to be implemented in order to maintain the original preferred outcome, or provide a modified preferred outcome. As described herein, these alerts may be provided as emails, texts, pop-up notifications, or the like.

In reference to FIGS. 4A-E, and continuing the illustrative example of a credit score scenario, the system may provide a gamified credit score scenario showing a current credit score 418, and a preferred credit score 420 as initially determined by the system. Associated with the preferred credit score 420 may be a set of icons 460. A user may then modify the outcome 420 to alternate preferred outcomes (e.g. 420*a* in FIG. 4C or 420*b* in FIG. 4D.) It is important to note that the preferred outcome 420 may be modified to be lower than the current credit score 418. As the user modifies the preferred outcome 420, the system may provide alternate scenarios including alternate variables 490, or combinations thereof. Further, the system may provide alternate combinations of icons (e.g. 460*a* in FIG. 4C or 460*b* in FIG. 4D) that represent alternate goods and services that may be available as a result of the modified preferred outcome. For example, as shown in FIG. 4D, a user may be able to modify the scenario to show a drop in credit score 420*b*. Even though the credit score has decreased, the system may show that a desired credit card offer or mortgage is still available 460*b*. Accordingly, a user may be able to determine how much of a drop in credit score may be sustained while still being able to achieve certain goods or services.

The system may further provide one or more safety markers 415. Although safety marker 415 is shown as a secondary marker in FIGS. 4D-E, it is contemplated that the safety marker 415 may also be an alert or notification 370, as described herein. Safety marker 415 may indicate to a user that should the preferred outcome 420 be modified past this point, then this may trigger changes in the variables that may be detrimental to the user. By way of an illustrative example, a user may generate a scenario to indicate whether or not they may be able to buy a car and how much down payment they are able to provide. However, if such actions may jeopardize a user's potential to buy a house, i.e. may jeopardize the success of another scenario that may already be implemented, such actions may be undesirable. Accordingly, a user may be able to use the scenario to determine how much decrease in credit score may be sustained during the process of applying for buying a car without impacting the user's implemented scenario directed to buying a house.

In an embodiment, the safety marker 415 may not initially be displayed in the scenario. Instead, the safety marker 415 may be an alert 370 that is displayed when the primary marker 420 passes a threshold, as represented by marker 415. For example, decreasing the preferred credit score 420 past the safety marker 415 may result in triggering a reaction from one or more of the third parties that results in decreasing the available credit limit to the user. The safety marker 415 may be determined by tertiary variables such as instructions directly from a third party. Alternatively, the safety marker 415 may be determined by secondary variables based on information from similar scenarios from other users of the system, or combinations thereof. In this way, the system may provide a 'safe guard' to the user to prevent selecting an outcome that may directly or indirectly affect the user, or other scenarios or outcomes in a detrimental way.

While the above examples are directed to credit scores, it will be appreciated that the system may provide other scenarios encountered by a user directed to other aspects of a user's life. For example, the system may help children or young adults to understand about savings and to motivate them towards certain savings goals. These secondary icons may direct the user towards demographically appropriate products. Equally the system may provide scenarios for more complex situations where metrics of progress may be less quantifiable, for example, the success of a charity, or the progress of a research group. In such cases quantifiable variables may be limited therefore the system may rely on secondary variables from similar scenarios to determine the impact of certain decisions or actions may have on the long-term goals of the organization. The system would then be able to illustrate these impacts in an easily understood and intuitive interface.

Figure 5:
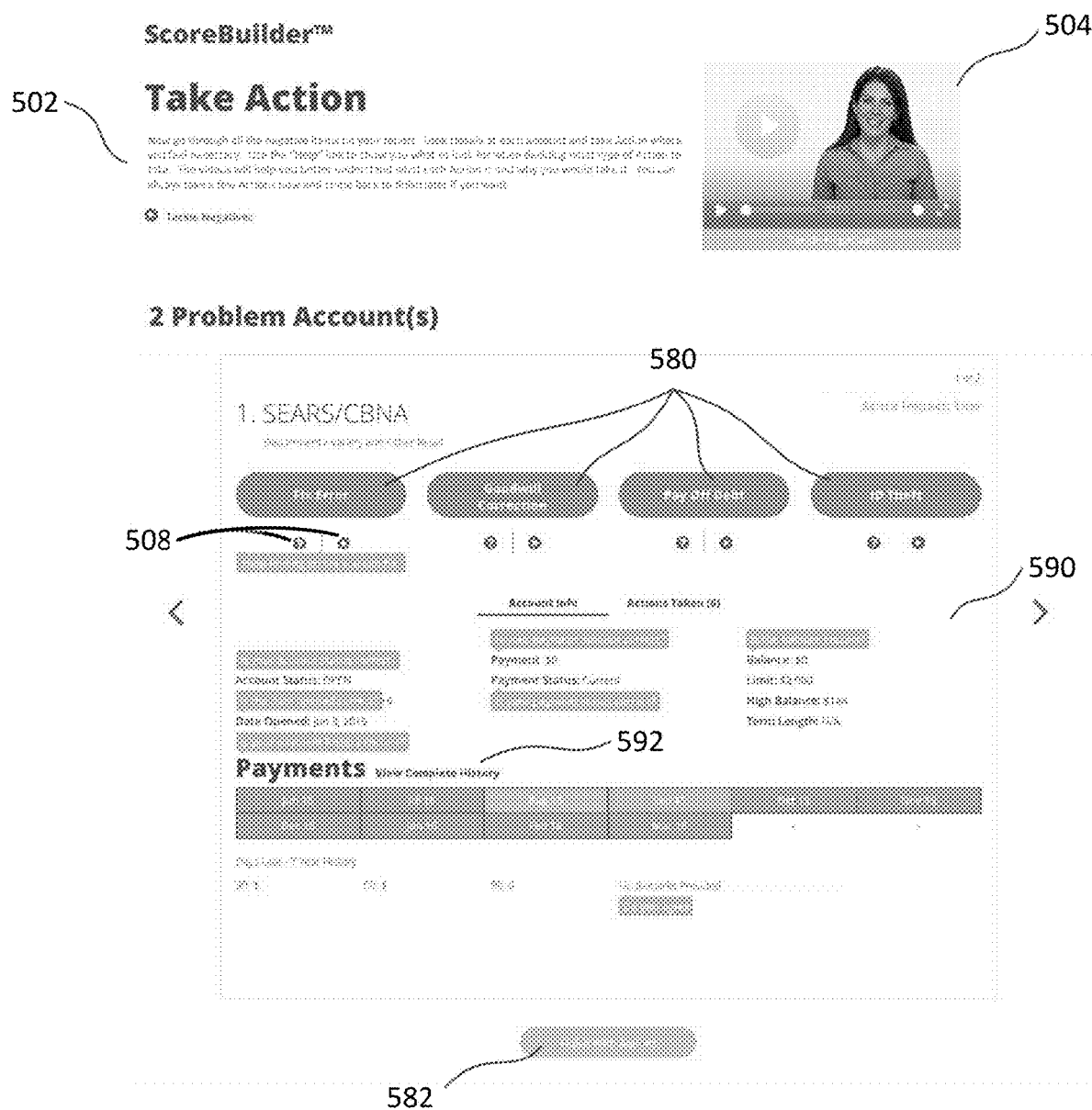
FIG. 5 illustrates an exemplary gamification interface of the system with actionable elements, in accordance with the present disclosure.

FIG. 5 shows an exemplary embodiment of a gamified user interface for a given scenario 500. It is contemplated that not all variables in a scenario may be quantitative and that scenarios may be based around qualitative, grouped or binary variables. Accordingly the system may provide a gamified user interface 500 which provides a set of options, groups or binary variables or outcomes. It is also contemplated that some scenarios may utilize both quantitative and qualitative variables and that aspects of the embodiments described herein may be combined. In exemplary embodiments one or more scenario user interfaces 300, 310, 312, 400, 410, 450, 500 may be used separately or in combination, for example once a preferred outcome has been set in a first user interface, for example user interface 350 or 400, the system may determine that certain qualitative, grouped or binary variables may be used to achieve the preferred outcome, accordingly a user may navigate to a second user interface, such as user interface 500 to implement these changes. In either case, the system may present a gamified user interface where a user may adjust, modify, or manipulate with different actions or combinations of actions that allow a user to achieve the optimum or preferred scenario.

The gamified user interface for a given scenario 500 may include instructions, 502, links to help advice or wizards 508, instructional videos 504, or a combination thereof. The scenario user interface 500 may also present one or more actionable elements 580 which relate to one or more qualitative, grouped or binary variables that may require action from the user in order to achieve a preferred or optimum outcome. The system may order the actionable elements based on impact on the outcome, temporal significance, or the like. The actionable elements may present the user with a binary decision. Non-limiting examples include, "Yes" or "No"; "Take Action" or "Ignore", or the like. The actionable elements may present the user with a grouped decision that include two or more options relating to the variable. Non-limiting examples include, "Low", "Medium", or "High"; "Take Action", "Ignore", or "Remind Me Later"; "Disagree", "Somewhat disagree", "Indifferent", or "Somewhat agree", "Agree", or the like. Each of the actionable elements may include one or more links to help advice 508, wizards, training videos, or the like. These may further advise the user on why the actionable element is presented, possible outcomes for actioning, or not actioning, the actionable element.

The scenario user interface 500 may also present additional information 590 about the variable or variables used in the scenario. The additional information 590 may include pertinent information about the variable to help a user identify which variable is being actioned, the current status of the variable, information regarding the classification or type of variable, past or future events that may have occurred that are pertinent to the variable, or the like. The additional information 590 may also include links 592. These links 592 may, for example, connect the user to one or more third parties where a user may obtain further information about the variable. These links 592 may also provide the user with additional interfaces, these interfaces may be, by way of non-limiting examples, additional gamified interfaces, calendars, internal or external tools, or the like. The additional information 590 may also include an indication of how much the particular variable or groups of variables affect the outcome.

The scenario user interface 500 may also present one or more actionable elements 582. These actionable elements 582 may allow a user to action various aspects of the scenario user interface 500. Non-limiting examples of possible actions include, returning to a previous scenario user interface, saving the current scenario user interface, actioning the current scenario, as discussed herein, to implement the scenario in a real-world setting, printing, saving, sending, or emailing instructions on how to implement the scenario in a real-world setting, connecting the user with one or more third parties, or providing instructions to one or more third parties, in order to implement the preferred or optimum scenario, or the like.

By way of a non-limiting example, the system may present a scenario user interface, such as scenario user interface 500, that allows a user to protect against identify theft. The system may use demographic, psychographic, economic variables from primary, secondary, and/or tertiary variable sources to determine if there has been an abnormal behavior that may signify to the user that identity theft may have occurred. The scenario user interface 500 may then highlight these "abnormal" variables and present one or more actionable elements 580 with which a user may further explore the abnormal variable to establish if the action was carried out by the user or not. The actionable elements 580 may also connect the user with various third parties in order to rectify the abnormal variable. For example, actionable elements 580 may connect the user with a social media site, if an account has been opened in the user's name. The system may also use secondary variables to provide various actionable elements 580 that are based on other user's actions. For example, the system may determine that most user's change the password to the their social media account after a given number of months, the scenario user interface 500 may then provide an actionable element 580 that connects the user with a social media account where the password has not been changed in more than the given number of months.

By way of a non-limiting example, the system may present a scenario where the most efficient way to achieve a preferred or optimum credit score may be to tackle various qualitative, grouped or binary variables that affect a user's credit score. The system may present a scenario user interface, such as scenario user interface 500. The scenario user interface 500 may present one or more qualitative variables that require one or more actions in order to achieve the user's preferred or optimum outcome. A user may select or deselect the one or more actionable elements 580 across different variables. The effect of these actions may be reflected in the displayed additional information 590. As previously noted, the synergistic effects of one or more variables may have a greater impact, either positively or negatively, on the outcome that the sum of the individual effects of the variables. In a real-world setting a user may be unaware of these synergistic effects since the variables may be provided by different third parties and decisions one each of the variable may be made independently of each other. However, an advantage of the present disclosure is that a user may adjust, observe, or manipulate with the different actions in a scenario to establish the optimum outcome. As also discussed herein, the system will highlight, promote, or suggest the actionable elements that will allow a user to achieve the optimum or preferred outcome most efficiently. Once the optimum combination of actions has been chosen by a user by way of the actionable elements 580, a user may then use one or more of the actionable elements 582 in order to implement the scenario in a real-world setting. It is also contemplated that should a user prefer to return to the scenario at a later date the actionable elements 582 may allow a user to save the current scenario.

In an exemplary embodiment the system may use secondary variables to determine or suggest the optimum combination of actions for a user. For example, based on similar scenarios encountered by other users of the system, the preferred outcomes of other users, and the real-world effects of the implemented scenario, the system may present certain types of variables included in the scenario, the types of actions available to a user for each of the variables, suggest optimum combinations of variables or actions for each variable, or combinations thereof. Such secondary variables may further enhance the accuracy of the scenario presented with that of real-world outcomes. Further, such secondary variables allow a user to see what other users in similar situations have done, the outcomes the other users preferred, and the accuracy of the scenario when implemented in a real-world setting, all while maintaining the privacy of the other users in the system.

In an exemplary embodiment, the actionable elements 580, help or advice 502 508, and additional information 590, may be further supplemented with secondary variables. For example, where a similar scenario may have been encounter by other users of the system, the predictive scenario engine 190 may provide additional options that other users took in order to achieve a similar outcome. It is also contemplated that the help or advice 502, 508 provided may be further supplemented by other user's opinions, advice, tips, suggestions, or the like. For example, certain actionable elements or combinations of actionable elements may include user ratings based on the satisfaction of the user with the real-world outcome compared with the proposed outcome. It is also contemplated that users of the system may rate the help or advice 502, 508 provided by other users.

In an exemplary embodiment, it is contemplated that a user interface 500 may not require a gamified outcome and instead provide a scenario that provides actionable elements. For example, the system may use primary, secondary, tertiary variables or combinations thereof to provide a scenario, similar to those described herein. As best seen in FIG. 5, due to the types of variables involved in the scenario, a gamified outcome may not be required. Instead the scenario may only provide actionable elements that allow a user to implement actions, instructions, or the like, directly in a real-world setting directly. This may be due to the scenario variables only requiring a binary decision as to whether to implement the outcome of the scenario or not. By way of a non-limiting example, the system may review primary, secondary, tertiary variables and determine by way of a set of predetermined rules or trends derived by the system from primary, secondary, tertiary variables, or combinations thereof, a scenario detailing a creditor, the scenario shows the creditor has recorded a late payment on a utility bill that is negatively affecting the user. The system may have determined a trend that other users often dispute the creditor in similar scenarios and disputing the creditor has resulted in the more positive outcome for the user. Accordingly, instead of providing a gamified outcome, the system may instead provide an actionable element. This actionable element may connect the user with a tool, third party, or the like, to dispute the late payment. In this way, the user may choose whether or not to implement the scenario or not. Although these are highly simplified examples, it will be appreciated that any number of variables, scenarios, actionable elements, combinations thereof, or the like, may be used to provide a user interface and a scenario to the user that may not require a gamified outcome.

Computing Environment

The present invention also relates to apparatus for performing the operations or processes herein. The apparatus may be specifically constructed for the required purposes, or it may comprise a general purpose computer. The general purpose computer may be coupled with various input/output (I/O) devices and selectively activated or reconfigured by a computer program stored in the computer. Such a computer program or software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or component) may be stored in persistent storage. Transmission medium may be construed as a physical or logical communication path between two or more network devices or between components within a network device. For instance, as a physical communication path, wired and/or wireless interconnects in the form of electrical wiring, optical fiber, cable, bus trace, or a wireless channel using radio frequency (RF) or infrared (IR), may be used. A logical communication path may simply represent a communication path between two or more network devices or between components within a network device. Portions of any modules or components described herein may be implemented in lines of code in software, configured logic gates in software, or a combination of both, and the portions implemented in software are tangibly stored on a computer readable storage medium.

The algorithms and displays presented herein are not inherently related to any particular computer, mobile device, equipment, display, or similar apparatus. Various general purpose systems may be used with programs in accordance with the teachings herein, or it may prove convenient to construct more specialized apparatus to perform the required process blocks. The required structure for a variety of these systems will appear from the description below. In the following description of exemplary embodiments, reference is made to the accompanying drawings that form a part hereof, and in which it is shown by way of illustration specific embodiments in which the invention can be practiced. It is to be understood that other embodiments can be used and structural changes can be made without departing from the scope of the embodiments of this invention. As used herein, the terms "couple," "connect," and "attach" are interchangeable and include various forms of connecting one part to another either directly or indirectly. Also, it should be appreciated that one or more structural features described in one embodiment could be implemented in a different embodiment, even if not specifically mentioned as being a feature thereof.

Computer System

Figure 6:
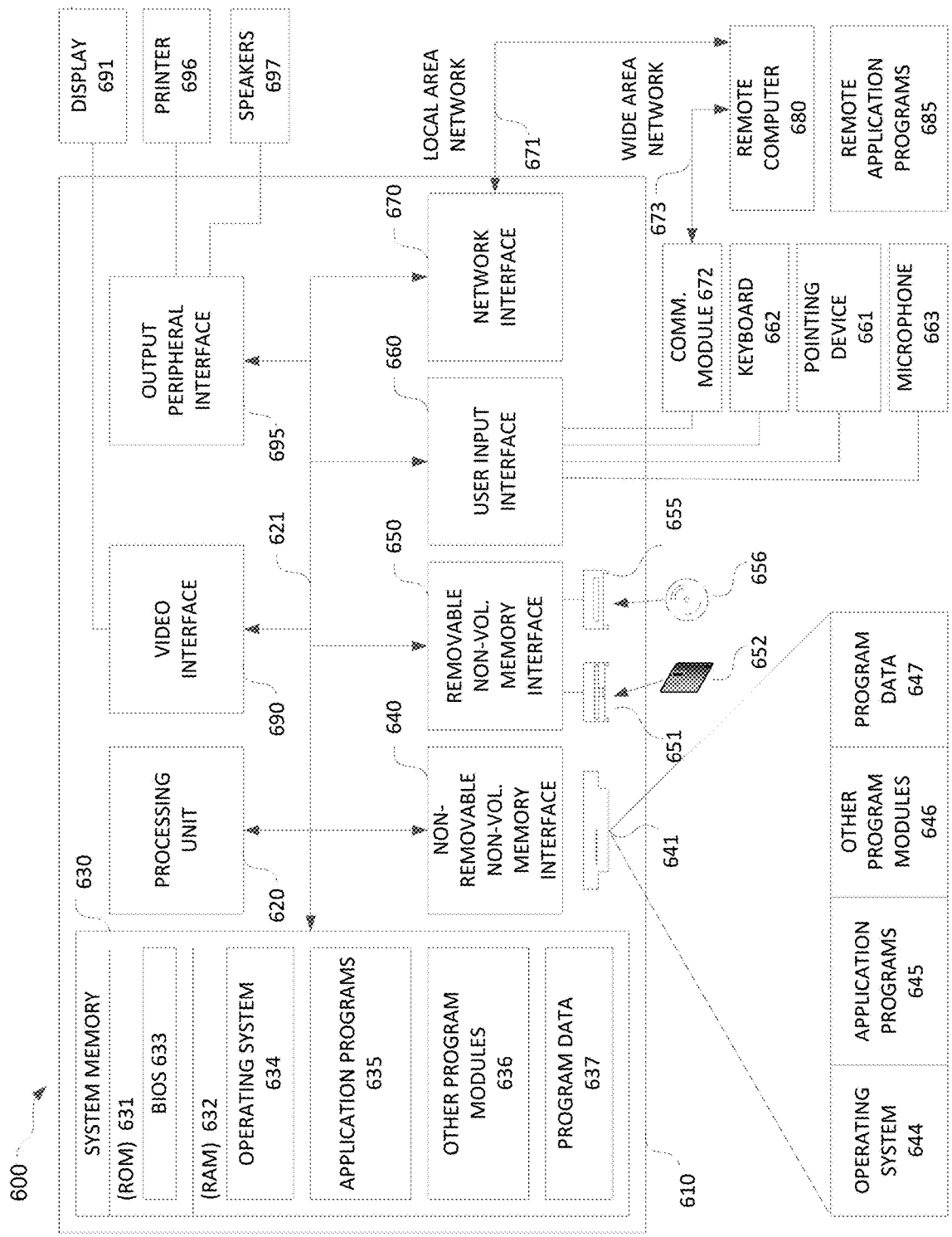
FIG. 6 illustrates an exemplary computing device that may be used, in accordance with the present disclosure.

FIG. 6 illustrates a block diagram of an example computing system environment 600 that may use an embodiment of one or more of the systems or processes discussed herein, in accordance with some example embodiments. The computing system environment 600 is only one example of a suitable computing environment, such as a client computing device or similar device, and is not intended to suggest any limitation as to the scope of use or functionality of the design. Neither should the computing system environment 600 be interpreted as having any dependency or requirement relating to any one or combination of components illustrated in the exemplary computing system environment 600. Embodiments of the invention may be implemented on any type of computer, device, apparatus, or even machine that make use of the computing system environment 600.

The design is operational with numerous other general purpose or special purpose computing system environments or configurations. Examples of well-known computing systems, environments, and/or configurations that may be suitable for use with the design include, but are not limited to, personal computers, server computers, embedded computer systems, system-on-chip (SOC), single-board computer system (SBC) (such as, for example, a computer-on-module (COM) or system-on-module (SOM)), virtual reality devices or headsets, hand-held devices, laptop devices, head or body mounted devices, multiprocessor systems, microprocessor-based systems, set top boxes, programmable consumer electronics, network PCs, minicomputers, kiosk computer, terminal computer, mainframe computer, mesh of computer systems, distributed computing environments spanning multiple systems or locations, that include any of the above systems or devices, automotive and informational appliances, or the like.

The design may be described in the general context of computing device executable instructions, such as program modules, being executed by a computer. Generally, the program modules include routines, programs, objects, components, data structures, etc., that perform particular tasks or implement particular abstract data types. Those skilled in the art can implement the description and/or figures herein as computer-executable instructions, which can be embodied on any form of computing machine readable media discussed herein.

The design may also be practiced in distributed computing environments where tasks are performed by remote processing devices that are linked through a communications network. In a distributed computing environment, program modules may be located in both local and remote computer storage media including memory storage devices.

With reference to FIG. 6, an exemplary computing system environment 600 includes a general-purpose computing device in the form of a computing device 610. Components of computing device 610 may include, but are not limited to, a processing unit 620 having one or more processing cores, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus.

Computing device 610 typically includes a variety of computing machine readable media. Computing machine readable media can be any available media that can be accessed by computing device 610 and includes both volatile and nonvolatile media, removable and non-removable media. By way of example, and not limitation, computing machine readable mediums uses include storage of information, such as computer readable instructions, data structures, program modules or other data. Computer storage mediums include, but are not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 610. Communication media typically embodies computer readable instructions, data structures, program modules, or other transport mechanism and includes any information delivery media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computing device 610, such as during start-up, is typically stored in ROM 631. RAM 632 typically contains data and/or program modules that are immediately accessible to and/or presently being operated on by processing unit 620. By way of a non-limiting example, FIG. 6 illustrates operating system 634, application programs 635, other program modules 636, and program data 637.

The computing device 610 may also include other removable/non-removable volatile/nonvolatile, transitory or non-transitory computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed herein and illustrated in FIG. 6, provide storage of computer readable instructions, data structures, program modules and other data for the computing device 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies.

A user may enter or receive information, execute commands or configuration changes, or the like with the computing device 610 through the video interface 690, output peripheral interface 695, or user input interface 660. The video interface 690, output peripheral interface 695, or user input interface 660 may be coupled with the computing device 610 via a system bus 621. The video interface 690, output peripheral interface 695, or user input interface 660 may be coupled with various input/output (I/O) devices with which a user may enter or receive information, execute commands, or the like. Such I/O devices may include by way of non-limiting examples, display 691, keyboard 662, microphone 663, pointing device 661, or printer 696. The pointing device 661 may include, by way of a non-limiting example, such as a mouse, trackball or touch pad. In some embodiments, the I/O devices may include a motion sensor or similar device, which allows the user to provide gesture or motion inputs to the computing device 610. In exemplary embodiments, the display 691 may include a displays with a wide field of view, stereoscopic displays, virtual reality googles, augmented reality glasses, televisions, smartphones, tablets, or the like.

In some embodiments the computing device 610 may be coupled with other I/O devices (not shown), these devices may include joysticks, game pads, satellite dish, scanner, virtual reality device, augmented reality device, body mounted device, kinetic devices that monitor the micro or macro movements of a person or provide tactile outputs to a user, accelerometers, gyroscopes, distance sensors, motion sensors, location sensors, global positioning systems (GPS), or the like. These and other I/O devices, may be connected to the processing unit 620 through, for example the user input interface 660, output peripheral interface 695, or the video interface 690, which are coupled to the system bus 621, but they may be connected directly or indirectly by way of other interface and bus structures. Such interface and bus structures may include parallel port, game port or a universal serial bus (USB). It is further contemplated that the I/O devices and/or the video interface 690, output peripheral interface 695, or user input interface 660 may operate autonomously or as extensions to other systems which then communicate with the computing device 610 remotely, either via wired or wireless communication means.

The computing device 610 may operate in a networked environment using logical connections to one or more remote computers, such as a remote computer 680. The remote computer 680 may be a personal computer, a handheld device, virtual reality system, a server, a router, a network PC, a peer device or other common network node, and typically includes many or all of the elements described above relative to the computing device 610. The logical connections depicted in FIG. 6 include a local area network (LAN) 671 and a wide area network (WAN) 673, but may also include other networks. Such networking environments are commonplace in offices, enterprise-wide computer networks, intranets, extranets, and the Internet. A browser, device, or system application may be resident on the computing device and stored in the memory.

When used in a LAN networking environment, the computing device 610 is connected to the LAN 671 through a network interface or adapter 670. When used in a WAN networking environment, the computing device 610 typically includes a communication module 672 or other means for establishing communications over the WAN 673, such as the Internet. The communication module 672 may be a modem used for wired, wireless communication or both. The communication module 672 may be internal or external, may be connected to the system bus 621 via the user-input interface 660, or other appropriate mechanism. In a networked environment, program modules depicted relative to the computing device 610, or portions thereof, may be stored in the remote memory storage device. By way of example, and not limitation, FIG. 6 illustrates remote application programs 685 as residing on remote computer 680. It will be appreciated that the network connections shown are exemplary and other means of establishing a communications link between the computers may be used. It should be noted that the present design can be carried out on a computing system such as that described with respect to FIG. 6. However, the present design can be carried out on a server, a computer devoted to message handling, or on a distributed system in which different portions of the present design are carried out on different parts of the distributed computing system.

Another device that may be coupled to bus 621 is a power supply such as a Direct Current ("DC") power supply and/or Alternating Current ("AC") adapter circuit. The DC power supply may be a battery, a fuel cell, or similar DC power source that needs to be recharged on a periodic basis. It will be appreciated that other forms of power supply may still be contemplated to be within the spirit and scope of the present disclosure. For wireless communication, the communication module 672 may employ a Wireless Application Protocol to establish a wireless communication channel. The communication module 672 may implement a wireless networking standard such as Institute of Electrical and Electronics Engineers (IEEE) 802.11 standard, IEEE std. 802.11-1999, published by IEEE in 1999. Other wireless communication processes that may also be used and may include Bluetooth, gigabit, Wi-Fi, Radio Frequency, infrared, or the like. It will be appreciated that other forms of wired and wireless communications may still be contemplated to be within the spirit and scope of the present disclosure.

Examples of mobile computing devices may be a laptop computer, a cell phone, 'smart' phone, a personal digital assistant, or other similar device with on board processing power and wireless communications ability that is powered by a Direct Current (DC) power source that supplies DC voltage to the mobile device and that is solely within the mobile computing device and needs to be recharged on a periodic basis, such as a fuel cell or a battery.

In exemplary embodiments a computing system environment 600 may entail memory and display functions without a processing function. For example, a third party may provide information to a user, which is relayed to a device for display only with no data manipulation necessary.

Network Environment

Figure 7:
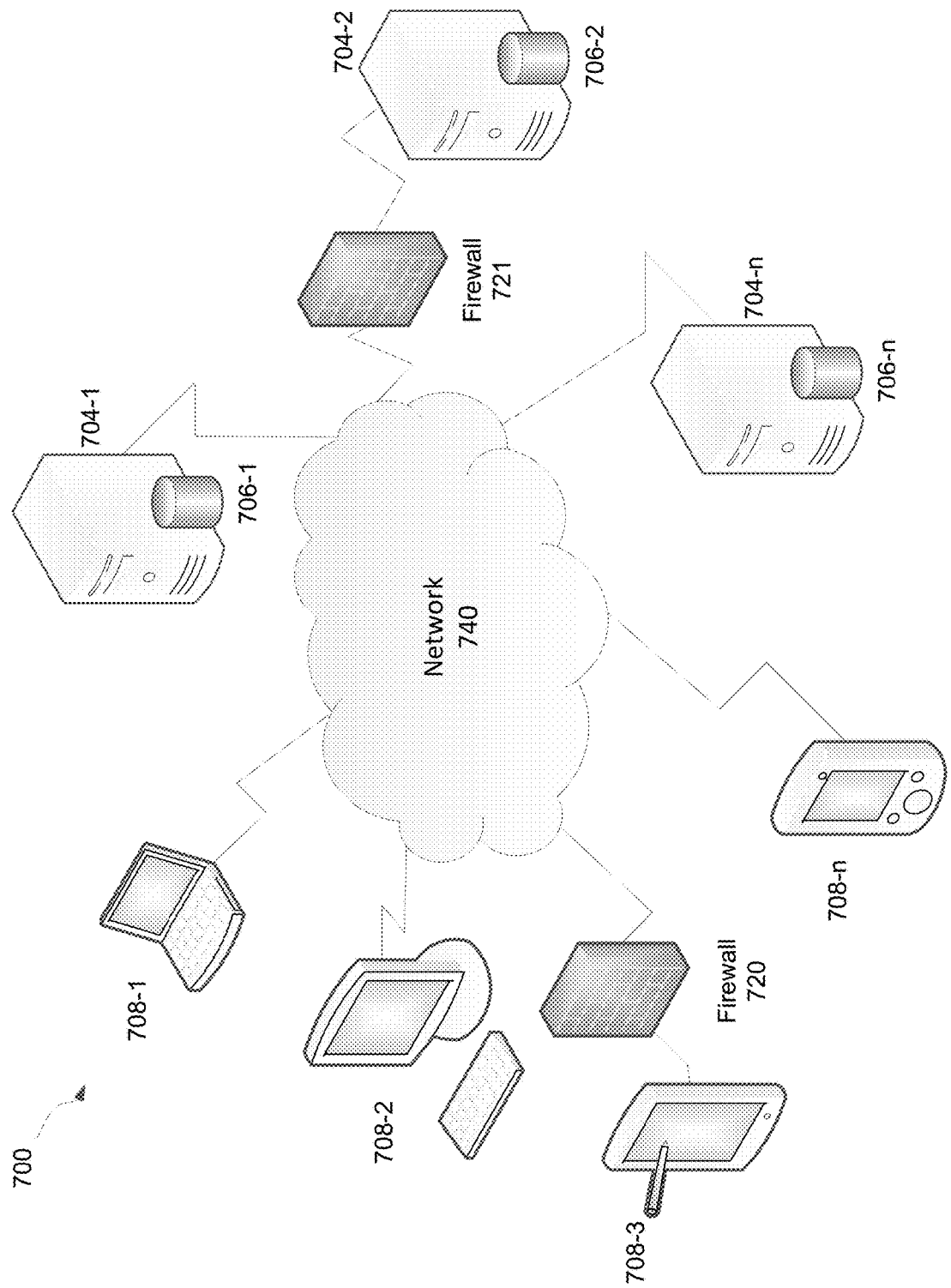
FIG. 7 illustrates an exemplary network that may be used, in accordance with the present disclosure.

FIG. 7 illustrates an exemplary network in which the techniques described herein may be applied, in accordance with some example embodiments. The network environment 700 has a network 740 that connects server computing systems 704-1 through 704-$n$, and at least one or more client computing systems 708-1 through 708-$n$. As shown, there may be many server computing systems 704-1 through 704-$n$ and many client computing systems 708-1 through 708-$n$ connected to each other via a network 740, which may be, by way of a non-limiting example, the Internet. Note, that in some embodiments the network 740 might be or include one or more of: an optical network, the Internet, a Local Area Network (LAN), Wide Area Network (WAN), satellite link, fiber network, cable network, or a combination thereof, or the like. It is to be further appreciated that the use of the terms client computing system and server computing system is for clarity in specifying who initiates a communication (the client computing system) and who responds (the server computing system). No hierarchy is implied unless explicitly stated. Both functions may be in a single communicating device, in which case the client-server and server-client relationship may be viewed as peer-to-peer. Thus, if two systems such as the client computing system 708-1 and the server computing system 704-1 can both initiate and respond to communications, their communication may be viewed as peer-to-peer. Likewise, communications between the client computing systems 704-1, 704-2 and the server computing systems 708-1, 708-2 may be viewed as peer-to-peer if each such communicating device is capable of initiation and response to communication. One or more of the server computing systems 704-1 to 704-$n$ may be associated with a database such as, for example, the databases 706-1 to 706-$n$. A firewall such as, for example, the firewall 720 between a client computing system 708-3 and the network 740, may be used to protect data integrity. Another firewall example is the firewall 721 positioned between the server 704-2 and the network 740. Although not shown, other devices (e.g., proxy servers and the like) may also be connected to the network 740.

FIG. 7 also illustrates a block diagram of an embodiment of a server computing system to provide information, such as a system parameter, etc. A user via a client computing system 708-3 may interact with the server computing system 704-1, and then supply input to the query/fields and/or service presented by a virtual reality system interface of the application. The virtual reality system parameter may be served by a server computing system 704-1 in any language using any wireless communication protocol, by way of a non-limiting example Wireless Access Protocol (WAP), to any enabled client computing system 708-3 or any equivalent thereof. For example, the client computing system 708-3 is shown as a tablet computer, however 708-3 may be a laptop, a netbook, smart phone, or the like. It is also contemplated that the system parameter may also be served from another system 708-1 through 708-$n$, such as a laptop or mobile device, or it may be initiated from the client computing system itself. The computing system 708-3 may host a browser to interact with the server computing system 704-1. Each application, widget, plug-in, etc. has a code scripted to perform the functions that the software component is coded to carry out such as presenting fields and icons to take details of desired information. The applications may be hosted on the server computing system 704-1 and served to the client computing system 708-3. The applications then present the information that allows the user to interact with the system.

Any application and other scripted code components may be stored on a computing machine readable medium which, when executed on the server causes the server to perform those functions. In an embodiment, the software used to facilitate the functions and processes described herein can be embodied onto a computing machine readable medium such as computer readable medium. As discussed above a computing machine readable medium includes any mechanism that provides (e.g., stores) information in a form readable by a machine (e.g., a computer). For example, a computing machine readable medium includes read only memory (ROM); random access memory (RAM); magnetic disk storage media; optical storage media; flash memory devices; DVD's, EPROMs, EEPROMs, FLASH, magnetic or optical cards, or any type of media suitable for storing electronic instructions. The information representing the apparatuses and/or processes stored on the computing machine readable medium may be used in the process of creating the apparatuses and/or processes described herein.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages such as C, C++, SQL, Java, or other variants of such or similar languages. Also, an algorithm may be implemented with lines of code in software, configured logic gates in software, or a combination of both. In an embodiment, the logic consists of electronic circuits that follow the rules of Boolean Logic, software that contain patterns of instructions, or any combinations thereof.

It should be noted that the configuration of the diagram illustrated in FIG. 7 is for illustrative purposes only, and the actual configurations may vary. There might be different configurations of servers, firewalls, clients, and devices. For example, the devices may include virtual reality equipment, tablet computers, vehicle 'infotainment' systems, TV devices, and the like.

It will be appreciated, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computing system, or similar electronic computing device, that manipulates and transforms data represented as physical (electronic) quantities within the computing system's registers and memories into other data similarly represented as physical quantities within the computing system memories or registers, or other such information storage, transmission or display devices.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. For example, specific examples are provided for shapes and materials; however, embodiments include those variations obvious to a person skilled in the art, such as changing a shape or combining materials together. Further, while some specific embodiments of the invention have been shown the invention is not to be limited to these embodiments. For example, several specific modules have been shown. Each module performs a few specific functions. However, all of these functions could be grouped into one module or even broken down further into scores of modules. Most functions performed by electronic hardware components may be duplicated by software emulation and vice versa. The invention is to be understood as not limited by the specific embodiments described herein, but only by scope of the appended claims.

While the invention has been described in terms of particular variations and illustrative figures, those of ordinary skill in the art will recognize that the invention is not limited to the variations or figures described. The features described with respect to one embodiment or variation may be used in other embodiments or variations. Processes described separately may be combined. In addition, where processes and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. Therefore, to the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A method for presenting a user interface and temporally appropriate advertising, comprising:
    generating, by an implementation engine component, a first user interface configured to:
        i) depict a first credit score and information associated with a first user, and
        ii) receive an input corresponding to selection of a second credit score;
    responsive to receiving the input, conducting, by a predictive scenario engine component, analytics on the first credit score, the second credit score, and the information associated with the first user, thereby generating a set of instructions for modifying the information associated with the first user;
    wherein conducting analytics includes processing the information associated with the first user, the first credit score, and the second credit score with a machine learning model that is trained, in part using secondary variables, to (i) determine key variables from the information associated with the first user pertinent to obtaining the second credit score, and (ii) determine, based in part on the key variables, a refined scenario where the first credit score has been modified to the second credit score and where the refined scenario includes the set of instructions;
    generating, by the implementation engine component, a second user interface configured to depict to the first user (i) the refined scenario including the second credit score and modifications to the information associated with the first user, and (ii) a first actionable display element;
    responsive to detecting, by the implementation engine component, a selection of the first actionable display element, providing the set of instructions to the first user; and
    providing, by an advertising engine component, one or more advertisements within a predetermined time-window based on the set of instructions for modifying the information associated with the first user, wherein the implementation engine component, the predictive scenario engine component and the advertising engine component comprise machine readable instructions executed on one or more processors.

2. The method according to claim 1, wherein the information associated with the first user further includes at least one of primary, secondary, or tertiary variables.

3. The method according to claim 2, wherein:
    primary variables include variables entered by the first user and include at least one of personal, demographic, geographic, economic, historical, social, behavioral, and psychographic information, secondary variables include information stored, derived from, or generated by one or more other users, different than the first user, or from previous user interfaces generated by the one or more other users, and tertiary variables include information provided by one or more third parties and include at least one of personal, demographic, geographic, economic, historical, social, behavioral, and psychographic information.

4. The method according to claim 1, wherein selection of the second credit score includes modifying the first user interface to position a marker along a slider.

5. The method according to claim 1, wherein the step of providing one or more advertisements further includes providing notifications or alerts to the first user within a predetermined time frame.

6. The method according to claim 1, further including providing an icon associated with the second user interface that indicates a good or service which will be available when the second credit score is achieved.

7. The method according to claim 1, wherein the first user interface and the second user interface are each configured to be depicted at one or more network devices utilized by the first user.

8. The method according to claim 7, wherein the step of generating the first user interface and the step of generating the second user interface are performed by logic at a first server node different than the one or more network devices utilized by the first user.

9. The method according to claim 1, wherein the information associated with the first user includes personal information and financial data, the financial data includes a list of one or more accounts of the first user displayed on the first user interface in a predetermined order, and wherein the modifications to the information associated with the first user includes modifying an order of the accounts displayed to the first user in the second user interface, and wherein the set of instructions includes an order with which the accounts are to be paid.

10. The method according to claim 1, wherein the step of providing the set of instructions to the first user includes transmitting one or more messages to a destination, wherein the one or more messages includes the set of instructions for modifying the information associated with the first user and causing modification of the first credit score to the second credit score.

11. The method according to claim 10, wherein the step of transmitting one or more messages to the destination includes transmitting one or more messages to a third party.

12. A non-transitory computer readable medium, when read by one or more processors, causes the one or more processors to execute:

an implementation engine configured to generate a first user interface including a primary marker associated with a first credit score, a secondary marker associated with a second credit score, and information associated with a first user;

a predictive scenario engine configured to process the first credit score, the second credit score, and the information associated with the first user, with a machine learning model that is trained, in part using secondary variables, to (i) determine key variables from the information associated with the first user, pertinent to obtaining the second credit score, and (ii) determine, based in part on the key variables, a refined scenario where the first credit score has been modified to the second credit score, and to generate a set of instructions for modifying the information associated with the first user to modify the first user's credit score from the first credit score to the second credit score; and an advertising engine configured to provide advertisements to the first user.

13. The non-transitory computer readable medium of claim 12, wherein the primary marker indicates the first user's current credit score, and the secondary marker indicates the first user's preferred credit score.

14. The non-transitory computer readable medium of claim 13, wherein the first user interface further includes a tertiary marker associated a third credit score and an icon associated with the tertiary marker that indicates goods or services that will be available when the first user's credit score is equal to the third credit score.

15. The non-transitory computer readable medium of claim 12, wherein the first user interface includes a first actionable display element, configured to transmit one or more messages to a destination, the one or more messages including the set of instructions.

16. The non-transitory computer readable medium of claim 15, wherein the advertising engine analyzes the set of instructions provided by the predictive scenario engine and provides advertisements within a predetermined time frame.

17. The non-transitory computer readable medium of claim 15, wherein the advertising engine analyzes the set of instructions provided by the predictive scenario engine and provides alerts within a predetermined time frame.

18. The non-transitory computer readable medium of claim 12, wherein the information associated with the first user includes personal information and financial information and at least one of demographic, geographic, historical, social, behavioral, or psychographic information.

19. The non-transitory computer readable medium of claim 13, wherein the secondary marker is configured to be modified by the first user by positioning the secondary marker along a slider.

20. The non-transitory computer readable medium of claim 12, wherein the first user interface provides a second actionable element that provides access to a third party to provide the set of instructions for modifying the information associated with the first user to the third party.

21. The non-transitory computer readable medium of claim 13, wherein the first user interface provides an icon that is associated with the secondary marker and indicates goods or services that will be available when the first user's credit score is equal to the second credit score.

22. The non-transitory computer readable medium of claim 12, wherein the information associated with the first user includes financial data that includes a list of one or more accounts of the first user displayed on the first user interface in a predetermined order, and wherein the set of instructions for modifying the information associated with the first user includes instructions for modifying an order of the accounts displayed to the first user to an order with which the accounts are to be paid.

23. The non-transitory computer readable medium of claim 12, wherein the secondary variables include information stored, derived from, or generated by one or more other users, different than the first user, or from previous sets of instructions generated by the one or more other users.

24. The non-transitory computer readable medium of claim 23, wherein the machine learning model is further trained using trends identified from secondary variables.

25. A network device, comprising:
one or more processors; and
memory communicatively coupled to the one or more processors, the memory comprises machine readable instructions that when executed by the one or more processors, cause the one or more processors to execute:
(i) an implementation engine component configured to generate a first user interface including a primary marker associated with a first credit score, a secondary marker associated with a second credit score, and information associated with a first user;
(ii) a predictive scenario engine component configured to process the first credit score, the second credit score, and the information associated with the first user, with a machine learning model that is trained, in part using secondary variables, to (i) determine key variables from the information associated with the first user, pertinent to obtaining the second credit score, and (ii) determine, based in part on the key variables, a refined scenario where the first credit score has been modified to the second credit score, and to generate a set of instructions for modifying the information associated with the first user to modify the first user's credit score from the first credit score to the second credit score; and
(iii) an advertising engine component configured to provide advertisements or notifications to the first user within a predetermined time frame.

26. The device according to claim 25, wherein the information associated with the first user includes at least one of personal, demographic, geographic, economic, historical, social, behavioral, trend, or psychographic information.

27. The device according to claim 25, wherein the first user interface includes a first actionable element configured to transmit one or more messages to a destination, the one or more messages including the set of instructions for modifying the information associated with the first user.

28. The device according to claim 25, wherein the first user interface further includes an icon associated with the secondary marker that indicates a good or service associated with the secondary marker and wherein the icon is selectable to provide access to details about the good or service.

29. The device according to claim 28, wherein the secondary marker is configured to be modified by the first user by positioning the secondary marker along a slider, and wherein the icon associated with the secondary marker is modified based on the position of the secondary marker along the slider.

30. The device according to claim 25, wherein the information associated with the first user includes a list of one or more accounts of the first user displayed on the first user interface in a predetermined order, and wherein the set of instructions for modifying the information associated with the first user includes instructions for modifying an order of the accounts displayed to the first user to an order with which the accounts are to be paid.

31. The device according to claim 25, wherein the secondary variables include information stored, derived from, or generated by one or more other users, different than the first user, or from previous sets of instructions generated by the one or more other users.

* * * * *